United States Patent Office 3,833,722
Patented Sept. 3, 1974

3,833,722
METHOD FOR CONTROLLING ALLERGIES
Doris Elaine Graybill, 2136 New Holland Pike,
Lancaster, Pa. 17601
No Drawing. Filed Mar. 16, 1971, Ser. No. 124,946
Int. Cl. A61k 27/00
U.S. Cl. 424—104                                    2 Claims

ABSTRACT OF THE DISCLOSURE

A method is provided for treating and controlling allergies caused by excess concentrations of certain metal ions in the body tissues of warm-blooded animals. In the method of this invention, the excess concentrations of the metallic ions are removed from the body tissues of the animal, preferably by administrating secretin which naturally induces the release of alkaline materials which in turn assists in the neutralizing and removal of the excess concentrations of the metal ions.

BACKGROUND OF THE INVENTION (1) Field of the Invention

This invention is concerned with the treatment of allergies in warm-blooded animals.

(2) Description of the Prior Art

There are many complex definitions given to the term allergy. Most experts in the field, however, agree that an allergy is an adverse response by a given member of a species to a substance that does not normally produce any obvious ill effects on most other members of the same species.

The adverse effects caused by an allergy can range from very mild effects to quite severe adverse effects and possibly even death. By far the relatively mild adverse effects are most common. These consist of various symptoms such as rashes, swelling, running noses, reddened eyes and intestinal irritations including diarrhea and the like. On the other extreme, however, the allergen, that is the material which causes the allergic reaction, can cause the bronchial tubes to swell and close thereby causing suffocation and death or the allergen can cause a deep anaphylactic shock, which likewise can also cause death. The most common type of allergy is what is commonly known to the layman as hay fever. This is somewhat of a misnomer since it is generally intended to include all types of allergies which are caused by airborne allergens. The most common type of allergen which causes hay fever is not produced by hay but by rag weed. Next to the allergies caused by airborne contaminants, food allergies are the most prevalent with the most common type of allergic reaction being towards even common types of foods, for example, milk, milk products like cheese, eggs, mushrooms, chocolate and grains, especially wheat. Common drugs and normal environmental components such as aspirin and penicillin and house dust can also cause allergic reactions.

In general, the degree of the problems caused by allergies not not fully appreciated. It should be noted that at least one person in ten is allergic to some degree to a particular material and 5% of the U.S. population is allergic in some degree specifically to pencillin.

The problem of the treatment and control of allergies is a costly and long standing problem. In 1969, for example, 135 million dollars were spent for prescription drugs to alleviate the symptoms of allergies as well as additional millions of dollars for non-prescription over-the-counter drugs for treatment of allergies. In addition, countless work hours were lost as well as a considerable amount of suffering encountered because of the effects normally associated with allergies.

Considerable research has been conducted on allergies. Various theories have been presented, each of which appears to have some merit and each of which has not proven to be completely supported by the surrounding data. At the present time, it can be fairly stated that the mechanism involved in the allergenic reaction is not even fairly well understood by those skilled in the art despite the extensive research work conducted on this problem to date.

One of the groups of early workers in this field was Prausnitz and Kustner. These men working together discovered that a normal unsensitized animal could be sensitized to a particular allergen in a localized area by injecting the serum from an allergen sensitive animal into the unsensitized animal. Suprisingly, however, the unsensitized animal would, after a relatively short period of time, again become unsensitized to the particular allergen. This was completely opposed to the normal effect encountered when administering materials for the purpose of immunization when the injection of a small amount of the material could permanently change the reaction of the recipient to the particular material injected.

More recently, research efforts have been directed to the study of the various components of the serum, particularly, the various types of immunoglobulins and their effect on the various types of allergies. It has been found that there are various types of immunoglobulins and these have been classified into selected groups. It is believed that certain particular types of these immunoglobulins attached themselves in a somewhat selective fashion to certain particular tissues such as the nose in hay fever, the bronchial tube in asthma and the gastrointestinal tract in food allergies so as to initiate the allergenic reaction. It is the combination of the immunoglobulin with the particular components comprising the tissues involved which is believed to initiate the allergenic reaction. The percent of certain immunoglobulins in the serum of an allergenic animal has been found to be somewhat higher than the amounts found in a normal animal. However, it should be noted that normal nonallergenic animals contain the same types of immunoglobulins even though they might be at a lower level than that found in the animal who is sensitive to certain allergens.

A further factor of considerable interest is that the sensitivity to particular allergens is highly selective. A given individual may be highly allergic to certain allergens and have absolutely no adverse effects at all from a different allergen which in turn may be highly allergenic to a second individual sensitive to that particular allergen.

This factor has added considerably to the problems of analyzing and treatment of allergies. The reason for the selectivity with regard to the effect of a particular allergen on a particular individual has completely eluded the researchers to date.

The research concerning the methods of controlling and treating allergenic reaction has, like the study of the allergenic reactions itself, been an area of considerable activity but unfortunately, without any substantial success. At present, there are only three principally used methods for the treatment and control of allergies in warm-blooded animals. The first method is to completely avoid contact with the allergen. Total avoidance is of course the simplest and best method of treatment. However, it is likewise often the most impractical. To avoid contact with certain allergens such as pollen, house dust, foods such as milk products, fish, etc. can lead to a test-tube like existence.

A second method which has been suggested is to inject the allergen into the allergic person in a large series of relatively small doses over an extended period of time so as to build up a type of immunization to the allergen. This method is dangerous as the injections themselves can cause the very allergenic reaction which is attempted to be avoided. In addition, this method has the very distinct disadvantage that it required an extensive series of injections over extremely long periods of time which is both time consuming, painful to the recipient and also quite expensive.

The third method which has been suggested is to control the symptoms of the allergen. This, of course, does not control the allergy but simply relieves the effects of the allergy. With relatively mild allergies, this is often all that the patient requires since to control the redness of the eyes, sneezing, etc., is sufficient to satisfy his needs. However, it should be appreciated that the treatment of a chronic condition such as an allergy with drugs to control the outward effects is not the optimum method of treatment since it is possible that the effect of the allergy can increase with time. The treatment with drugs only controls the effects of the allergenic condition and at best, only masks the manifest symptoms of the condition.

One of the major problems encountered in the control and treatment of any allergenic condition is the determination of the particular allergen or allergens which are causing the condition. Sometimes this is a relatively simple procedure if it is observed that when certain selected foods, for example, when chocolate is ingested that the allergenic effect always occurs. However, this does not automatically determine that this is the only effective allergen. If a mixture of foods is ingested, it is often difficult to determine which component is the effective allergen. In order to provide adequate safety with regard to the treatment of the allergenic condition, most often it is necessary to test the patient to determine the allergen sensitivity of the patient. Considering the fact that there are literally hundreds of compounds and compositions which are effective as allergens with regard to particular individuals, it is often a time consuming and expensive procedure to completely screen a given individual with regard to his sensitivity. The skin test is the most widely used method to determine allergen sensitivity. In this method, a small amount of a suspected allergen is injected under the skin and the effect is evaluated by determining if there is a change in the skin, for example, a reddening or swelling after an injection of the material. An adverse reaction to a particular allergen is considered to be a positive test and steps are then taken to control allergenic reactions induced by this particular allergen. The skin test is a highly unsatisfactory test since it is quite painful, time consuming and at best, is only a crude indication of the allergy sensitivity. Many materials which are, in fact, borderline positive allergens give negative results in the skin tests.

It is accordingly an object of this invention to overcome the aforementioned problems and difficulties encountered in the prior art.

It is a more specific object of this invention to provide a method for treating and controlling allergies in warm-blooded animals.

It is a still more specific object of this invention to provide a simplified method for the treatment of allergies in warm-blooded animals.

It is an additional further object of this invention to provide an improved method for determining the allergy sensitivity of a given warm-blooded animal.

It is yet an additional object of this invention to provide a method for sensitizing the test animals to given allergens.

Other objects and advantages of this invention will become further apparent hereinafter and from the reading of the sub-joined claims.

SUMMARY OF THE INVENTION

It has been found that one of the causal factors producing allergenic reactions in warm-blooded animals is an excess concentration of heavy metal ions in the body tissues. The allergenic reactions can be treated or controlled by removing the excess amounts of the heavy metal ions. In the preferred embodiment of this invention secretin, an intestinal hormone, is injected directly into the venous blood which causes a release of an alkaline fluid which assists in the removal of the excess amounts of the metallic ions from the body tissues thereby averting the allergenic reaction with the allergens.

DESCRIPTION OF THE PREFERRED EMBODIMENTS

It has been found that when an abnormal amount of a heavy metal ion is introduced into the body of warm-blooded animals which is greater than that which the animal can neutralize, that there is a marked degree of degeneration of the transitional zone of the jejunum. Since the hormone secretin is produced in the jejunum, there is a corresponding decrease in the output of secretin.

The heavy metal ions referred to herein, are those metals having a molecular weight of 5 or more and can, for example, be the cupric, cobalt, manganese, ferric, ferrous, zinc, lead, mercuric, gold, antimony, bismuth, cadminum, and nickelous ions. The heavy metal ions can enter the body by various routes. The metal ion can enter through the respiratory system when soluble salts of the metal ions are dissolved in the liquids normally associated with the mucous membranes of the nose, mouth, lungs, etc. The heavy metal ions can be ingested, for example, by drinking or eating food contaminated with high amounts of the metallic ions or even by ingesting the heavy metal ions deliberately, as by taking an excess amount of vitamin or mineral tablets. The excess metals can also likewise be absorbed, for example, from metallic jewelry, dentures, fillings or restorations (permanent or temporary), and the like, or acquired as a result of a bacterialogical infection. The excess metal ions can also be deliberately injected into the animal in the form of physiologically acceptable salt as in the example to follow.

The method by which the excess amount of the metals is accumulated in the body tissues is not important since the effect on the body tissue is substantially identical without regard to the method by which the metal ion is introduced. It should be appreciated that certain minor amounts of many of these metal ions are required for normal body function and that the normal amounts do not cause any difficulty. Exactly what is the proper amount of a given metal for a given animal will vary depending upon the particular metal and the particular animal. However, any amount of a given metal or combination of metals which significantly effects the body reactivity toward allergens and particularly an amount which has an adverse effect on the output of secretin is definitely excessive.

In accordance with one aspect of the present invention, a particular animal can be rapidly screened to determine if there is an abnormal concentration of any particular heavy metal ion in the body tissues of the animal.

It was further found that heavy metal ions will combine with certain amino acids and when heated from 51–56° C. to produce chemically labeled antigens. These antigens will then react with foreign proteins because of the electrically charged nature of the radicals.

It has been further found that as a result of additional research that the blood serum both in vivo and in vitro can be sensitized with heavy metals. The sensitized serums, when heated at 51–56° C. with commercially produced allergens and commercially produced spectrographically pure amino acids will cause agglutination to occur indicative of an allergenic reaction.

It is important to carefully note that the same serum which was not sensitized with the heavy metal did not agglutinate, while the serum from an animal known to have a given allergy under identical conditions, showed positive agglutination when reacted with the allergen to which the test animal was allergic.

As noted above, the amount of secretin produced by a given animal is dependent to a large extent upon the concentration of the metal ions in the body tissues of the animal. Secretin is an intestinal hormone formed by the mucosa of the upper portion of the small intestine. It was discovered and identified by W. M. Bayliss and E. H. Startling in 1905. No therapeutic function for secretin was ever discovered with regard to abnormal body functions. It has, heretofore, however, been used as a diagnostic tool in order to test the effectiveness of the pancreatic and gall bladder function. The pure secretin molecule is a basic polypeptide which is crystalline and has a molecular weight of about 5,000. It has been found that the injection of a few micrograms i.e., 1–10 per kilogram of body weight of given animal causes the pancreas to secrete profusely within approximately a minute. The pancreatic juices that are secreted are thin, watery and low in enzyme content. The juices are, however, very high in bicarbonates and carbonates. Secretin also increases the liver output. It is believed, as a result of the work of the present invention, that it is one of the primary functions of the hormone secretin to activate the body's normal neutralizing functions to remove the abnormal amounts of metals in the body permitting the body to naturally rid itself of excess amounts of metals, thereby keeping the metal or mineral content in the body in balance. The exposure, however, to considerable excess amounts of heavy metals greater than the amount which the body can rid itself of naturally, results in a dual effect on the body. The excess metal ion concentration degenerates the jejunum and correspondently reduces the output of the secretin which further complicates the problem of metal accumulation in the body. It is believed that the excess metals when combined with the amino acids of the body make the tissues reactive with the foreign allergens. The metals can be considered to act as mordants in the allergenic reaction. Without the metal, the allergen will not react with the body protein.

The selectivity of a given individual animal can likewise be explained by this reaction. As will be shown in greater detail below, the selectivity of the given allergenic reaction between an allergen and a given metal-sensitized amino acid is dependent on the selection of the particular metal utilized in the sensitizing of the animal.

The allergenic sensitivity of a given individual can readily be determined according to various methods within the scope of the present invention. In the testing methods of this invention as opposed to the prior art skin test methods, a single blood sample is taken and all tests required are run from the single sample. The serological method as opposed to the skin test method is safer, and less painful since only a single injection is required and more important, it is considerably more accurate and safe.

The following test methods have been developed to determine sensitivities to foreign protein materials apart from the animal being tested to insure the prevention of anaphylaxis, and to determine without doubt, which antigens are positive. A blood sample is extracted from the animal.

TEST I

Small quantities of serum (0.05 cc.) from which all red cells are removed is pipetted into the concavities of a series of agglutination slides. A drop of a different single pure protein extract is added to each slide and mixed with the serum sample by circular rotation of a flat surface. The slides are then placed on a preheated (51–56° C.) glass surface for approximately 5–10 minutes. After the 5–10 minute period, the slides are removed from the heated glass and examined with a microscope with 100× magnification for a reaction (positive) or no, (negative) reaction. A positive reaction indicates that the animal from which the serum was taken is allergic to that particular extract; however, if no reaction is observed, the animal subject is not allergic to that particular extract.

TEST II

This method incorporates the use of micro test tubes. The required number of micro test tubes are placed in a test tube rack and numbered in consecutive order. Into each tube, a small quantity (0.05 cc.) of serum is pipetted. A small quantity of a different pure protein extract is added to each tube and mixed. The test tubes are placed in a water bath at 51–56° C. for 15–20 minutes. At the conclusion of the test period the test tubes are removed and each tube is examined for a fluocculation type reaction and/or color change which indicates that the serum is reactive to that particular protein extract.

TEST III

Another method which can be used to determine positive sensitivities to foreign proteins requires the use of whole blood instead of the serum. A drop of whole blood is placed on a glass slide and mixed with a drop of pure protein extract. The slide is placed on a glass plate surface (51–56° C.) which is heated and tilted back and forth, end on end until the mixture exhibits a granular or grainy appearance. This appearance is the result of the reaction between the serum and the protein extract which in turn pushes the red cells together producing the appearance of clumping. This reaction can be seen without the aid of a microscope; however, there is greater chance of error in reading the end point if the reaction is very weak. The possibility of the occurrence of false positive reactions is increased when an anticoagulant is used due to the heavy metal impurities which are present.

If the reaction is negative, a smooth satiny appearance will result when the heated slide is tilted back and forth.

False positives occur through the introduction of a heavy metal impurity in the anticoagulant chemical which is used as an integral part of a blood sample in the test procedure or if an improperly buffered mineral element is used in one of the component solutions of the test procedure.

It is a specific teaching of this invention that allergenic responses to allergens can be treated or controlled by removing the excess amounts of the heavy metal ions from the body tissues of the warm-blooded animal. The particular method employed for the removal of the metal ions from the body tissues of the animal can be selected from any number of well known chemical techniques. For example, certain of the metal ions can be removed by conventional chelating agents well known to those skilled in the art. An even more simpler method is to administer a bicarbonate for example, sodium bicarbonate either orally or by intravenous injection to simulate the natural body function employed for removal of the excess amounts of the metallic elements. The most efficient method, however, for the removal of the excess amounts of the metal ions in the body tissues of the warm-blooded animal is by the injection of the hormone secretin. Secretin is administered in amounts sufficient to reduce the amount of the concentration of the metal in the body tissue to that which is required for normal body functioning. Secretin is preferably injected directly into the body. Thus, the amount of secretin employed is dependent upon the amount of the heavy metal ion and the type of heavy metal ion. The amount of secretin that is administered can be from for example, 2–4 micrograms per kilogram of body weight to considerably larger amounts. Secretin being a naturally produced body hormone relatively inert with regard to its properties can be safely administered into substantially larger doses than are actually required with out any adverse side effects. In addition, the effect of secretin is additive, therefore it can be made in a series of two to three injections over a period of time and after each injection, checking the effect of the secretin on the allergy sensitivity by one of the above noted methods. Once the serum of a given animal exhibits a negative reaction to the allergens, the warm-blooded animal exhibits a freedom from the allergenic reactions previously encountered by that animal to allergens. However, it should be further noted that it is strongly suggested that, if possible, the animal should be isolated from the source of the heavy metal ion contamination. For example, if the contamination is a result of wearing certain types of jewelry or as a result of dentures, or fillings, these can readily be replaced with non-allergenic materials. In the case where the heavy metals cause the degeneration of the jejunum and the corresponding output of secretin, it is possible that under the proper maintenance of secretin that the jejunum will regenerate itself and then naturally produce sufficient secretin to control the amounts of heavy metal ions in the blood and thereby eradicate the allergy sensitivity. Where the jejunum tissue is sufficiently degenerated that it cannot be regenerated to produce sufficient secretin to maintain the proper balance of metals in the in the body tissue or if the jejunum inherently does not produce sufficient secretin, it is considered to be clinically necessary to supply, on a regular basis, a maintenance dosage of secretin or employ one of the other heavy metal ion removal techniques so as to control the amount of the heavy metal ions in the blood stream of the warm-blooded animal.

The close relationship of the concentration of the heavy metals in the tissues to allergen sensitivity was observed clinically. As the concentration of the heavy metals were increased in the body tissues of test animals, there was a corresponding and abnormal increase in the eosinaphils count. Nucleated red cells were also observed in the blood picture.

In order to further explain this invention, specific reference will be made to the following examples. In all cases the parts are given in weight, not volume unless otherwise indicated. The following examples are given by way of illustration of the invention and are not intended to limit in any way the scope of the sub-joined claims.

EXAMPLE 1

Twenty-four (24) New Zealand white rabbits male and female were paired according to weight. Each weighed 5-6 pounds. From each rabbit, a blood sample was extracted from the midvein of the ear and checked by the laboratory methods, as previously described under Tests I, II and III, to determine whether or not there were any antibodies present. The coagulated blood sample was centrifuged and the serum was used. The serum samples were tested with the essential and non-essential amino acids. All the rabbits' serum samples were negative. Peripheral blood smears were also made. After a week of adjusting to new quarters, each pair of rabbits was sensitized by using 0.01% of a heavy metal chloride in triple glass distilled water. Each pair was sensitized by a different single heavy metal.

Twenty-four hours after the intial injection, a blood sample was extracted from the midvein of the ear of each rabbit and allowed to coagulate. The whole blood sample was centrifuged and the serum was then checked by the above methods to determine whether or not a precipitation reaction had occurred. Ten groups out of twelve showed positive precipitation had occurred. The remaining two groups were given a second shot of their respective heavy metal and checked in another twenty-four hours. These two groups then showed a positive precipitation after the second injection.

During the total test procedure, it was noted that some of the rabbits excreted a large amount of mucous in their urine. Also large amounts of mucous were passed from their noses. It was necessary to wipe their noses clean in order that they could breathe adequately. As they struggled to breathe, rales could be heard audibly. Sneezing was prevalent in all subjects as well as persistent scratching. All rabbits were listless. Based on these obervations, two stains were used to demonstrate the presence or absence of mucous in the tissues of the sensitized rabbit while a nonsensitized rabbit showed a negative result for mucous.

Microscopic examination of the sensitized rabbit tissues, after completion of the test, showed thickening of the bronchial wall, squamous metaplasia of the bronchial epithelium, and hyperplasia of the epithelium. Mucosal basement membrane was markedly thickened and hyalinized, especially in those rabbits showing severe mucosal hyperplasia. Thickening of the bronchial musculature was also found. Fibrosis of the submucosa and muscularis also occurs. Large number of eosinophils were often present in fibrotic tissues and increase in lymphocytes and plasma cells may be noted in all coats of the bronchi. Mucous production by the goblet cells of the mucosa and the bronchial mucous glands was abundant, and the glands are hypertrophied. The bronchi showed mucous mixed with varying numbers of granulocytes, especially the eosinophils. Sufficient blood was extracted to conduct approximately 220 tests on each rabbit (see Charts 1, 2, and 3). The first group of tests was conducted by using commercially prepared allergens, manufactured by the Hollister-Stier Laboratories. Their products are approved by the American Medical Association. The diagnostic extracts are comprised of a 1:10 dilution in 50% glycerine. The glycerine diluent (control) was non-reactive singly with each blood sample. Each sample of blood serum was tested to 189 single allergens. Each serum sample was also singly tested with each of the amino acids, essential and non-essential, for a reaction pattern (see Chart 4). Food, pollen, mold or miscellaneous epidermal allergens were tested by the conventional skin testing method. The rabbit's abdomen was shven clean of hair and marked into squares with a non-reactive material. Each serum positive commercially prepared antigen was injected into each separate square and after ½ hour, reactions were tabulated. In some cases a wheal with eratheyma was observed; however, in many cases no reaction was observed. After 24 hours the test sites were rechecked for delayed reactions and observations noted. In Charts 1, 2 and 3 the line indicated with the letter A indicates the results obtained as a result of precipitation tests conducted on the serum, while the line C indicates the results obtained as a result of the reaction on the skin test.

As was specifically stated above, the skin test in addition to being more painful and time consuming also is considerably more inaccurate. Many allergen extracts gave negative results on the skin tests, while definite positive results were obtained with the blood tests.

The paired rabbits are identified with a number, for example, 1 and a number and a letter 1A. It was of interest to note that while there was remarkable duplication between each of the pairs with regard to their relative sensitivity to the allergens. In some of the pairs one of the members showed a greater resistance to the allergen than the other member. This variation between the effect on the rabbits of each pair is believed to be due in part to the inherent greater resistance connected with a larger increase in the secretin output, naturally occurring in certain members of the given species. Some of the test results were the result of a marginal sensitivity. This can be seen for example, in a case of rabbits 2 and 2A with regard to their reactivity to the apricot extract. Both rabbits showed a negative result on the skin test, but on the more sensitive blood precipitation test, one rabbit showed a positive test.

An important and useful feature of Charts 1, and 2, and 3 is that once the particular metal or metals that are sensitizing agents are determined that by checking the chart, an accurate prediction can be made with regard to the relative allergenic sensitivity to other types of allergens in a given warm-blooded animal. This assists considerably in the control of the allergies during the interim during which the corrective measures are being taken to overcome the allergy.

Upon completion of the tests just described, another set of blood smears was taken to check the eosinophil count. The eosinophil count was abnormally high. Also nucleated red cells were observed in some cases.

It should be further appreciated that the technique of injecting test animals with sensitizing effective amounts of heavy metal ions to produce sensitized test animals is highly valuable in itself, and is useful for the preparation of test animals for the evaluation of drugs for controlling allergenic reactions and testing drugs for more effectively controlling and rapidly reversing the effects of anaphylactic shock.

CHART NO. 1

[Effect of cupric, cobalt, manganese, ferric and zinc ions]

| Sensitizing agents in triple glass distilled H₂O | Exp. rabbit No. | Method | Almond | Apple | Apricot | Arrow-root | Asparagus | Banana | Barley | Beef | Beet | Black pepper | Brazil nut | Broccoli | Buckwheat | Cabbage | Cantaloupe | Carrot |
|---|---|---|---|---|---|---|---|---|---|---|---|---|---|---|---|---|---|---|
| 1 — Cupric chloride | 1 | A | – – | +– | +– | – – | – – | – – | – – | – – | – – | – – | – – | – – | – – | – – | – – | – – |
| 2 — do | 1 | C | – – | +– | +– | – – | – – | – – | – – | – – | – – | – – | – – | – – | – – | – – | – – | – – |
|  | 1A | A | – – |  |  |  |  |  |  |  |  |  |  |  |  |  |  |  |
|  | 1A | C | – – |  |  |  |  |  |  |  |  |  |  |  |  |  |  |  |
| 3 — Cobalt chloride | 2 | A | – – | – – | – – | – – | – – | – – | – – | – – | – – | – – | – – | – – | – – | – – | – – | – – |
| 4 — do | 2 | C | – – | – – | +– | – – | – – | – – | – – | – – | – – | – – | – – | – – | – – | – – | – – | – – |
|  | 2A | A |  |  |  |  |  |  |  |  |  |  |  |  |  |  |  |  |
|  | 2A | C |  |  |  |  |  |  |  |  |  |  |  |  |  |  |  |  |
| 5 — Manganese chloride | 3 | A | – – | ++ | ++ | – – | – – | – – | ++ | – – | – – | – – | – – | – – | – – | – – | – – | – – |
| 6 — do | 3 | C | – – | ++ | ++ | – – | – – | – – | – – | – – | – – | – – | – – | – – | – – | – – | – – | – – |
|  | 3A | A |  |  |  |  |  |  |  |  |  |  |  |  |  |  |  |  |
|  | 3A | C |  |  |  |  |  |  |  |  |  |  |  |  |  |  |  |  |
| 7 — Ferric chloride | 4 | A | – – | – – | – – | – – | – – | – – | – – | – – | – – | – – | – – | – – | – – | – – | – – | – – |
| 8 — do | 4 | C | ++ | – – | +– | – – | – – | – – | – – | – – | – – | – – | – – | – – | – – | – – | – – | – – |
|  | 4A | A |  |  |  |  |  |  |  |  |  |  |  |  |  |  |  |  |
|  | 4A | C |  |  |  |  |  |  |  |  |  |  |  |  |  |  |  |  |
| 9 — Zinc chloride | 5 | A | – – | +– | +– | – – | +– | +– | – – | +– | – – | – – | – – | – – | +– | – – | +– | +– |
| 10 — do | 5 | C | ++ | – – | – – | – – | – – | – – | – – | – – | – – | – – | ++ | ++ | – – | – – | ++ | ++ |
|  | 5A | A |  |  |  |  |  |  |  |  |  |  |  |  |  |  |  |  |
|  | 5A | C |  |  |  |  |  |  |  |  |  |  |  |  |  |  |  |  |

| Sensitizing agents in triple glass distilled H₂O | Exp. rabbit No. | Method | Cauliflower | Celery | Cheese (Amer.) | Cherry | Chicken | Chocolate | Cinnamon | Clam | Cloves | Cocoanut | Codfish | Coffee | Corn | Crab | Cucumber | Egg white |
|---|---|---|---|---|---|---|---|---|---|---|---|---|---|---|---|---|---|---|
| 1 — Cupric chloride | 1 | A | – – | – – | ++ | – – | +– | +– | +– | – – | +– | – – | – – | ++ | – – | – – | – – | – – |
| 2 — do | 1 | C | – – | – – | +– | +– | – – | ++ | +– | – – | +– | – – | – – | – – | – – | – – | – – | – – |
|  | 1A | A |  |  |  |  |  |  |  |  |  |  |  |  |  |  |  |  |
|  | 1A | C |  |  |  |  |  |  |  |  |  |  |  |  |  |  |  |  |
| 3 — Cobalt chloride | 2 | A | – – | – – | +– | – – | – – | ++ | +– | +– | ++ | – – | ++ | – – | – – | – – | – – | – – |
| 4 — do | 2 | C | – – | ++ | ++ | – – | ++ | ++ | ++ | ++ | ++ | – – | – – | ++ | – – | – – | – – | – – |
|  | 2A | A |  |  |  |  |  |  |  |  |  |  |  |  |  |  |  |  |
|  | 2A | C |  |  |  |  |  |  |  |  |  |  |  |  |  |  |  |  |
| 5 — Manganese chloride | 3 | A | – – | ++ | ++ | – – | ++ | ++ | ++ | – – | ++ | – – | – – | – – | – – | – – | – – | – – |
| 6 — do | 3 | C | – – | – – | ++ | – – | ++ | ++ | +– | – – | ++ | – – | – – | ++ | – – | – – | – – | – – |
|  | 3A | A |  |  |  |  |  |  |  |  |  |  |  |  |  |  |  |  |
|  | 3A | C |  |  |  |  |  |  |  |  |  |  |  |  |  |  |  |  |
| 7 — Ferric chloride | 4 | A | – – | +– | +– | +– | +– | +– | ++ | – – | ++ | – – | – – | +– | – – | – – | – – | – – |
| 8 — do | 4 | C | – – | – – | – – | – – | – – | +– | +– | – – | +– | – – | – – | – – | – – | – – | – – | – – |
|  | 4A | A |  |  |  |  |  |  |  |  |  |  |  |  |  |  |  |  |
|  | 4A | C |  |  |  |  |  |  |  |  |  |  |  |  |  |  |  |  |
| 9 — Zinc chloride | 5 | A | ++ | – – | +– | – – | – – | +– | +– | – – | – – | – – | – – | +– | – – | – – | +– | – – |
| 10 — do | 5 | C | ++ | – – | +– | – – | – – | +– | +– | – – | – – | ++ | ++ | ++ | – – | – – | ++ | ++ |
|  | 5A | A |  |  |  |  |  |  |  |  |  |  |  |  |  |  |  |  |
|  | 5A | C |  |  |  |  |  |  |  |  |  |  |  |  |  |  |  |  |

CHART NO. 1—Continued

| Sensitizing agents in triple glass distilled H₂O | Exp. rabbit No. | Method | Egg yolk | English walnut | Garlic | Gelatine | Ginger | Grape | Green pepper | Grapefruit | Halibut | Herring | Hops | Lamb | Lettuce | Lima bean | Lobster | Mackerel |
|---|---|---|---|---|---|---|---|---|---|---|---|---|---|---|---|---|---|---|
| 1. Cupric chloride | 1 / 1 | A / C | ++ / ++ | ++ / ++ | ++ / ++ | – – / – – | – – / – – | +– / – – | – – / – – | – – / – – | – – / – – | – – / – – | – – / – – | – – / – – | – – / – – | – – / – – | – – / – – | – – / – – |
| 2. ...do... | 1A / 1A | A / C | +– / – – | +– / – – | +– / – – | – – / – – | – – / – – | – – / – – | – – / – – | – – / – – | – – / – – | – – / – – | – – / – – | – – / – – | – – / – – | – – / – – | – – / – – | – – / – – |
| 3. Cobalt chloride | 2 / 2 | A / C | ++ / ++ | ++ / ++ | – – / – – | – – / – – | – – / – – | – – / – – | – – / – – | +– / – – | – – / – – | – – / ++ | ++ / – – | – – / – – | +– / – – | – – / – – | – – / – – | – – / – – |
| 4. ...do... | 2A / 2A | A / C | – – / – – | – – / – – | +– / – – | – – / – – | – – / – – | – – / – – | – – / – – | – – / – – | – – / – – | – – / – – | – – / – – | – – / – – | – – / – – | – – / – – | – – / – – | – – / – – |
| 5. Manganese chloride | 3 / 3 | A / C | ++ / ++ | ++ / ++ | ++ / – – | – – / – – | – – / – – | – – / – – | – – / – – | – – / ++ | – – / – – | – – / – – | ++ / ++ | – – / – – | – – / – – | – – / – – | – – / – – | – – / – – |
| 6. ...do... | 3A / 3A | A / C | ++ / ++ | – – / – – | – – / – – | – – / – – | +– / – – | – – / – – | +– / – – | – – / – – | – – / – – | – – / – – | – – / – – | – – / – – | – – / – – | – – / – – | – – / – – | – – / – – |
| 7. Ferric chloride | 4 / 4 | A / C | ++ / ++ | – – / +– | – – / – – | – – / – – | – – / – – | – – / – – | – – / – – | – – / – – | – – / – – | – – / – – | – – / – – | – – / – – | – – / – – | – – / – – | – – / – – | – – / – – |
| 8. ...do... | 4A / 4A | A / C | ++ / ++ | – – / – – | ++ / – – | – – / – – | – – / – – | ++ / – – | – – / – – | – – / – – | – – / – – | – – / – – | – – / – – | – – / – – | – – / – – | – – / – – | – – / – – | – – / – – |
| 9. Zinc chloride | 5 / 5 | A / C | +– / – – | – – / +– | – – / – – | +– / – – | +– / – – | +– / ++ | +– / – – | +– / – – | – – / – – | – – / – – | +– / – – | – – / – – | – – / – – | – – / – – | – – / ++ | – – / – – |
| 10. ...do... | 5A / 5A | A / C | ++ / ++ | – – / – – | ++ / – – | – – / – – | – – / – – | – – / ++ | – – / – – | – – / – – | ++ / – – | – – / – – | – – / – – | – – / – – | – – / – – | +– / – – | – – / – – | – – / – – |

| Sensitizing agents in triple glass distilled H₂O | Exp. rabbit No. | Method | Malt | Milk (cows) | Milk (goats) | Mushroom | Mustard | Navy bean | Oat | Olive | Onion | Orange | Oyster | Pea | Peach | Peanut | Pear | Pecan |
|---|---|---|---|---|---|---|---|---|---|---|---|---|---|---|---|---|---|---|
| 1. Cupric chloride | 1 / 1 | A / C | +– / – – | +– / – – | – – / – – | – – / – – | +– / – – | – – / – – | – – / – – | +– / – – | +– / – – | +– / – – | +– / – – | – – / – – | +– / – – | – – / – – | – – / – – | – – / – – |
| 2. ...do... | 1A / 1A | A / C | – – / – – | +– / – – | – – / – – | – – / – – | +– / – – | – – / – – | – – / – – | – – / – – | +– / – – | – – / – – | – – / – – | – – / – – | – – / – – | +– / – – | – – / – – | +– / – – |
| 3. Cobalt chloride | 2 / 2 | A / C | – – / – – | – – / – – | – – / – – | – – / – – | ++ / – – | – – / – – | – – / – – | – – / – – | – – / – – | ++ / – – | – – / – – | – – / – – | ++ / – – | ++ / – – | ++ / – – | – – / – – |
| 4. ...do... | 2A / 2A | A / C | – – / – – | – – / – – | – – / – – | – – / – – | – – / – – | – – / – – | – – / – – | – – / – – | – – / – – | – – / – – | – – / – – | – – / – – | – – / – – | – – / – – | – – / – – | – – / – – |
| 5. Manganese chloride | 3 / 3 | A / C | – – / – – | – – / – – | – – / – – | – – / – – | ++ / – – | – – / – – | – – / – – | – – / – – | ++ / – – | – – / – – | – – / – – | – – / – – | – – / – – | ++ / – – | – – / – – | ++ / – – |
| 6. ...do... | 3A / 3A | A / C | – – / – – | – – / – – | – – / – – | – – / – – | – – / – – | – – / – – | – – / – – | – – / – – | – – / – – | – – / – – | – – / – – | – – / – – | – – / – – | – – / – – | – – / – – | – – / – – |
| 7. Ferric chloride | 4 / 4 | A / C | – – / – – | – – / – – | – – / – – | – – / – – | ++ / ++ | – – / – – | – – / – – | – – / – – | – – / – – | – – / – – | – – / – – | – – / – – | – – / – – | – – / – – | – – / – – | ++ / – – |
| 8. ...do... | 4A / 4A | A / C | – – / – – | – – / – – | – – / – – | – – / – – | +– / – – | – – / – – | – – / – – | +– / – – | ++ / +– | – – / – – | – – / – – | – – / – – | – – / – – | ++ / – – | – – / – – | ++ / +– |
| 9. Zinc chloride | 5 / 5 | A / C | +– / – – | – – / – – | – – / – – | +– / – – | – – / – – | – – / – – | – – / – – | – – / – – | – – / – – | – – / – – | – – / – – | – – / – – | – – / – – | – – / – – | – – / – – | +– / – – |
| 10. ...do... | 5A / 5A | A / C | ++ / – – | – – / – – | – – / – – | – – / – – | – – / – – | – – / – – | – – / – – | – – / – – | – – / – – | – – / – – | – – / – – | – – / – – | – – / – – | – – / – – | – – / – – | ++ / – – |

CHART NO. 1—Continued

| Sensitizing agents in triple glass distilled H₂O | Exp. rabbit No. | Method | Pineapple | Plum | Pork | Potato | Prune | Raspberry | Rhubarb | Rice | Rye | Salmon | Shrimp | Sole (flounder) | Soy bean | Spinach | Squash | Strawberry |
|---|---|---|---|---|---|---|---|---|---|---|---|---|---|---|---|---|---|---|
| 1... Cupric chloride | 1 | A | ++ | ++ | ++ | ++ | ++ | ++ | !! | ++ | ++ | !! | !! | ++ | ++ | ++ | ++ | ++ |
| 2......do...... | 1 | C | !! | !! | +! | !! | !! | +! | ++ | !! | !! | ++ | !! | !! | !! | ++ | !! | ++ |
| 3... Cobalt chloride | 1A | A | !! | ++ | !! | !! | ++ | ++ | !! | ++ | ++ | !! | ++ | +! | ++ | !! | ++ | !! |
| 4......do...... | 1A | C | !! | !! | +! | !! | !! | !! | +! | !! | !! | +! | !! | +! | !! | !! | !! | +! |
| 5... Manganese chloride | 2A | A | !! | !! | !! | !! | !! | ++ | ++ | !! | !! | ++ | !! | ++ | !! | ++ | !! | ++ |
| 6......do...... | 2A | C | ++ | !! | !! | !! | !! | ++ | ++ | !! | !! | ++ | !! | ++ | !! | !! | !! | ++ |
| 7... Ferric chloride | 3A | A | !! | !! | !! | !! | !! | !! | ++ | !! | !! | ++ | !! | ++ | !! | +! | !! | ++ |
| 8......do...... | 3A | C | !! | !! | !! | !! | !! | ++ | !! | !! | !! | +! | !! | !! | !! | !! | !! | !! |
| 9... Zinc chloride | 4A | A | !! | !! | !! | !! | !! | +! | !! | !! | !! | ++ | !! | !! | !! | !! | !! | +! |
| 10......do...... | 4A | C | !! | !! | +! | !! | !! | +! | +! | !! | !! | ++ | !! | ++ | !! | !! | !! | ++ |

| Sensitizing agents in triple glass distilled H₂O | Exp. rabbit No. | Method | String bean | Sweet potato | Tea | Tomato | Tuna fish | Turkey | Turnip | Veal | Water-melon | Wheat | Yeast (bakers) | Yeast (brewers) | Camel hair | Cat hair | Cattle hair | Cotton |
|---|---|---|---|---|---|---|---|---|---|---|---|---|---|---|---|---|---|---|
| 1... Cupric chloride | 1 | A | !! | !! | ++ | ++ | ++ | !! | !! | ++ | ++ | !! | ++ | !! | !! | !! | !! | !! |
| 2......do...... | 1 | C | !! | !! | +! | !! | !! | +! | !! | !! | !! | !! | !! | !! | !! | !! | !! | !! |
| 3... Cobalt chloride | 1A | A | !! | ++ | !! | +! | ++ | !! | ++ | !! | !! | !! | !! | !! | !! | !! | !! | ++ |
| 4......do...... | 1A | C | !! | !! | +! | !! | +! | ++ | !! | !! | !! | !! | !! | !! | !! | !! | !! | !! |
| 5... Manganese chloride | 2A | A | !! | !! | ++ | !! | ++ | ++ | !! | !! | !! | !! | !! | !! | !! | !! | !! | !! |
| 6......do...... | 2A | C | !! | !! | ++ | !! | ++ | ++ | !! | !! | !! | !! | !! | !! | !! | !! | !! | !! |
| 7... Ferric chloride | 3A | A | !! | !! | ++ | !! | ++ | ++ | !! | !! | !! | !! | !! | !! | !! | !! | !! | !! |
| 8......do...... | 3A | C | !! | !! | !! | !! | +! | !! | !! | !! | !! | !! | !! | !! | !! | !! | !! | !! |
| 9... Zinc chloride | 4A | A | !! | !! | +! | !! | +! | !! | +! | +! | !! | !! | !! | !! | !! | !! | !! | !! |
| 10......do...... | 4A | C | !! | !! | !! | !! | ++ | !! | +! | !! | !! | !! | !! | !! | !! | !! | !! | !! |

CHART NO. 1—Continued

| Sensitizing agents in triple glass distilled H₂O | Exp. rabbit No. | Method | Cotton-seed | Dog Hair | Feathers (mix) | Flaxseed | Furs (mixed) | Glue | Goat Hair | Grain Mill Dust | Henna | Hog Hair | Horse Dander | Horse Dust | Human Hair | Jute | Kapok | Karaya Gum |
|---|---|---|---|---|---|---|---|---|---|---|---|---|---|---|---|---|---|---|
| 1... Cupric chloride | 1 | A | — | — | ++ | — | — | — | — | — | — | — | — | + | — | — | — | — |
|  | 1 | C | — | — | — | — | — | — | — | — | — | — | — | — | — | — | — | — |
| 2........do........ | 1A | A | — | ++ | — | — | — | — | — | — | — | ++ | — | — | — | — | — | — |
|  | 1A | C | — | — | — | — | — | — | — | — | — | — | — | — | — | — | — | — |
| 3.... Cobalt chloride | 2 | A | — | — | — | — | — | — | — | ++ | — | — | — | — | — | — | — | — |
|  | 2 | C | — | — | — | — | — | — | — | — | — | — | — | — | — | — | — | — |
| 4........do........ | 2A | A | — | — | — | — | — | + | — | — | ++ | +  | — | — | — | — | — | + |
|  | 2A | C | — | — | — | — | — | — | — | — | — | — | — | — | — | — | — | — |
| 5.... Manganese chloride | 3 | A | ++ | — | — | — | — | — | — | — | — | — | — | — | — | — | — | — |
|  | 3 | C | — | — | — | — | — | — | — | — | — | — | — | — | — | — | — | — |
| 6........do........ | 3A | A | — | ++ | — | — | — | — | — | — | — | — | — | — | — | — | — | — |
|  | 3A | C | — | — | — | — | — | — | — | — | — | — | — | — | — | — | — | — |
| 7.... Ferric chloride | 4 | A | — | — | — | — | — | — | — | — | + | — | — | — | — | — | — | — |
|  | 4 | C | — | — | — | — | — | — | — | — | — | — | — | — | — | — | — | — |
| 8........do........ | 4A | A | ++ | — | — | — | — | — | — | — | + | — | — | — | — | — | — | — |
|  | 4A | C | — | — | — | — | — | — | — | — | — | — | — | — | — | — | — | — |
| 9.... Zinc chloride | 5 | A | + | — | — | — | — | — | — | — | + | — | — | — | — | — | — | — |
|  | 5 | C | — | — | — | — | — | — | — | — | — | — | — | — | — | — | — | — |
| 10.......do........ | 5A | A | — | — | — | — | — | — | — | — | — | — | — | — | — | — | ++ | — |
|  | 5A | C | — | — | — | — | — | — | — | — | — | — | — | — | — | — | — | — |

| Sensitizing agents in triple glass distilled H₂O | Exp. rabbit No. | Method | Kleenex | Newsprint mix | Orris root | Pyrethrum | Rabbit hair | Rayon | Sheep Wool | Silk | Sisal | Tobacco Smoke | Upholstery dust | Alternaria | Aspergillus (mix) | Chaetomium | Helminthoaporium |
|---|---|---|---|---|---|---|---|---|---|---|---|---|---|---|---|---|---|
| 1... Cupric chloride | 1 | A | — | — | — | — | — | — | — | — | — | — | — | — | — | — | — |
|  | 1 | C | — | — | — | — | — | — | — | — | — | — | — | — | — | — | — |
| 2........do........ | 1A | A | — | — | ++ | — | — | — | — | — | — | + | ++ | ++ | — | — | — |
|  | 1A | C | — | — | — | — | — | — | — | — | — | — | — | — | — | — | — |
| 3.... Cobalt chloride | 2 | A | — | — | — | — | — | — | — | — | + | — | — | — | — | — | — |
|  | 2 | C | — | — | — | — | — | — | — | — | — | — | — | — | — | — | — |
| 4........do........ | 2A | A | — | — | — | — | — | — | — | — | — | — | — | — | — | — | — |
|  | 2A | C | — | — | — | — | — | — | — | — | — | — | — | — | — | — | — |
| 5.... Manganese chloride | 3 | A | — | — | — | — | — | — | — | — | — | — | — | — | — | — | — |
|  | 3 | C | — | — | — | — | — | — | — | — | — | — | — | — | — | — | — |
| 6........do........ | 3A | A | — | — | — | — | — | — | — | — | — | — | — | — | — | — | — |
|  | 3A | C | — | — | — | — | — | — | — | — | — | — | — | — | — | — | — |
| 7.... Ferric chloride | 4 | A | — | — | — | — | — | — | — | — | — | — | — | — | — | — | — |
|  | 4 | C | — | — | — | — | — | — | — | — | — | — | — | — | — | — | — |
| 8........do........ | 4A | A | — | — | — | — | — | — | — | — | — | — | — | — | — | — | — |
|  | 4A | C | — | — | — | — | — | — | — | — | — | — | — | — | — | — | — |
| 9.... Zinc chloride | 5 | A | — | — | — | ++ | +  | — | — | — | — | — | — | — | — | — | — |
|  | 5 | C | — | — | — | — | — | — | — | — | — | — | — | — | — | — | — |
| 10.......do........ | 5A | A | — | — | — | — | — | — | — | — | — | — | — | — | — | — | — |
|  | 5A | C | — | — | — | — | — | — | — | — | — | — | — | — | — | — | — |

CHART NO. 1—Continued

| Sensitizing agents in triple glass distilled H₂O | Exp. rabbit No. | Method | Hormo-dendrum | Monilia | Mucor | Penicillium (mix) | Rhizopus | Tri-chophyton | Alnus incana | Fraxinus americana | Betula nigra | Acer negundo | Populus deltoides | Ulmus americana | Hicoria ovata | Acer saccharum | Quercus alba |
|---|---|---|---|---|---|---|---|---|---|---|---|---|---|---|---|---|---|
| 1. Cupric chloride | 1 / 1 | A / C | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 2. ...do... | 1A / 1A | A / C | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 3. Cobalt chloride | 2 / 2 | A / C | -- / -- | -- / -- | -- / -- | -- / -- | -- / -- | -- / -- | -- / -- | -- / -- | -- / -- | -- / -- | -- / -- | -- / -- | -- / -- | -- / -- | ++ / -- |
| 4. ...do... | 2A / 2A | A / C | ++ / ++ | -- / -- | +/ -- | -- / -- | -- / -- | -- / -- | -- / -- | -- / -- | -- / -- | -- / -- | -- / -- | -- / -- | -- / -- | -- / -- | -- / -- |
| 5. Manganese chloride | 3 / 3 | A / C | -- / -- | -- / -- | ++ / -- | -- / -- | -- / -- | -- / -- | -- / -- | -- / -- | -- / -- | -- / -- | -- / -- | -- / -- | -- / -- | -- / -- | -- / -- |
| 6. ...do... | 3A / 3A | A / C | -- / -- | -- / -- | -- / -- | -- / -- | ++ / -- | -- / -- | -- / -- | -- / -- | -- / -- | -- / -- | -- / -- | -- / -- | -- / -- | -- / -- | -- / -- |
| 7. Ferric chloride | 4 / 4 | A / C | ++ / ++ | -- / -- | -- / -- | -- / -- | -- / -- | -- / -- | -- / -- | -- / -- | ++ / -- | -- / -- | -- / -- | -- / -- | -- / -- | -- / -- | +/ -- |
| 8. ...do... | 4A / 4A | A / C | ++ / ++ | -- / -- | ++ / -- | -- / -- | -- / -- | -- / -- | -- / -- | -- / -- | -- / -- | -- / -- | -- / -- | -- / -- | -- / -- | -- / -- | -- / -- |
| 9. Zinc chloride | 5 / 5 | A / C | +/ -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 10. ...do... | 5A / 5A | A / C | ++ / ++ | -- / -- | ++ / -- | -- / -- | -- / -- | -- / -- | -- / -- | -- / -- | -- / -- | -- / -- | -- / -- | -- / -- | -- / -- | -- / -- | -- / -- |

| Sensitizing agents in triple glass distilled H₂O | Exp. rabbit No. | Method | Platanus acci-dentatis | Juglans nigra | Salix nigra | Poa compressa | Bromus inermis | Festuca elatori | Poa pratensis | Doctylis glomerata | Agropyron repens | Agrostis alba | Lolium perenne | Anthox-anthum odoratum | Phleum pratense | Holcus lanatus | Xanthium canadense | Taraxacum officinale |
|---|---|---|---|---|---|---|---|---|---|---|---|---|---|---|---|---|---|---|
| 1. Cupric chloride | 1 / 1 | A / C | -- / -- | -- / -- | -- / -- | -- / -- | -- / -- | -- / -- | +/ -- | -- / -- | -- / -- | -- / -- | -- / -- | -- / -- | -- / -- | -- / -- | -- / -- | -- / -- |
| 2. ...do... | 1A / 1A | A / C | -- / -- | -- / -- | -- / -- | -- / -- | -- / -- | -- / -- | -- / -- | -- / -- | ++ / ++ | ++ / -- | ++ / -- | ++ / -- | ++ / -- | -- / -- | -- / -- | ++ / -- |
| 3. Cobalt chloride | 2 / 2 | A / C | -- / -- | -- / -- | +/ -- | -- / -- | -- / -- | -- / -- | -- / -- | -- / -- | ++ / -- | -- / -- | -- / -- | -- / -- | -- / -- | -- / -- | -- / -- | -- / -- |
| 4. ...do... | 2A / 2A | A / C | ++ / ++ | -- / -- | ++ / -- | -- / -- | -- / -- | -- / -- | -- / -- | -- / -- | -- / -- | -- / -- | -- / -- | -- / -- | -- / -- | -- / -- | -- / -- | -- / -- |
| 5. Manganese chloride | 3 / 3 | A / C | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 6. ...do... | 3A / 3A | A / C | ++ / ++ | -- / -- | -- / -- | -- / -- | -- / -- | -- / -- | -- / -- | -- / -- | -- / -- | -- / -- | -- / -- | +/ -- | -- / -- | -- / -- | -- / -- | -- / -- |
| 7. Ferric chloride | 4 / 4 | A / C | ++ / ++ | -- / -- | ++ / -- | -- / -- | -- / -- | -- / -- | -- / -- | -- / -- | -- / -- | -- / -- | -- / -- | -- / -- | -- / -- | +/ -- | -- / -- | -- / -- |
| 8. ...do... | 4A / 4A | A / C | +/ -- | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 9. Zinc chloride | 5 / 5 | A / C | ++ / ++ | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 10. ...do... | 5A / 5A | A / C | ++ / ++ | -- / -- | ++ / -- | -- / -- | -- / -- | -- / -- | -- / -- | -- / -- | -- / -- | -- / -- | -- / -- | -- / -- | -- / -- | -- / -- | -- / -- | -- / -- |

CHART NO. 1—Continued

| Sensitizing agents in triple glass distilled H₂O | Exp. rabbit No. | Method | Rumex crispus | Golden rod | Kochia scoparia | Chenopodium alba | Iva ciliata | Amaranthus retroflexus | Plantago lanceolata | Ambrosia trifida | Ambrosia elatior | Rumex acetosella | House dust | Control |
|---|---|---|---|---|---|---|---|---|---|---|---|---|---|---|
| 1... Cupric chloride | 1 / 1 | A / C | – / – | – / – | – / – | – / – | – / – | – / – | – / – | – / – | – / – | – / – | – / – | – / – |
| 2... do | 1A / 1A | A / C | – / – | –+ / + | – / – | – / – | ++ / – | – / + | – / – | – / + | – / – | – / + | – / – | –+ / + |
| 3... Cobalt chloride | 2 / 2 | A / C | – / – | + / – | – / – | ++ / – | – / – | – / – | – / – | – / – | ++ / – | – / – | – / – | – / – |
| 4... do | 2A / 2A | A / C | – / – | – / – | – / – | – / – | – / – | – / – | – / – | – / – | – / – | – / – | – / – | – / – |
| 5... Manganese chloride | 3 / 3 | A / C | – / – | – / – | – / – | – / – | – / – | – / – | – / – | – / – | – / – | – / – | – / – | – / – |
| 6... do | 3A / 3A | A / C | – / – | – / – | – / – | – / – | – / – | – / – | – / – | – / – | ++ / – | – / – | – / – | – / – |
| 7... Ferric chloride | 4 / 4 | A / C | – / – | – / – | – / – | – / – | – / – | – / – | – / – | – / – | – / – | – / – | – / – | – / – |
| 8... do | 4A / 4A | A / C | – / – | – / – | – / – | – / – | – / – | – / – | – / – | – / – | – / – | – / – | – / – | – / – |
| 9... Zinc chloride | 5 / 5 | A / C | – / – | – / – | – / – | – / – | – / – | – / – | – / – | – / – | – / – | – / – | – / – | – / – |
| 10... do | 5A / 5A | A / C | – / – | – / – | – / – | – / – | ++ / – | – / – | ++ / – | – / – | – / – | – / – | – / – | – / – |

CHART NO. 2

[Effect of lead, mercuric, gold, antimony and bismuth ions]

| Sensitizing agents in triple glass distilled H₂O | Exp. rabbit No. | Method | Almond | Apple | Apricot | Arrowroot | Asparagus | Banana | Barley | Beef | Beet | Black pepper | Brazil nut | Broccoli | Buckwheat | Cabbage | Cantaloupe | Carrot |
|---|---|---|---|---|---|---|---|---|---|---|---|---|---|---|---|---|---|---|
| 11... Lead chloride | 6 / 6 | A / C | – / – | +1 / – | +1 / – | – / – | – / – | +1 / – | – / – | +1 / – | – / – | – / – | – / – | +1 / – | – / – | +1 / – | +1 / – | – / – |
| 12... do | 6A / 6A | A / C | – / – | – / – | – / – | – / – | – / – | – / – | – / – | – / – | – / – | – / – | – / – | – / – | – / – | – / – | – / – | – / – |
| 13... Mercuric chloride | 7 / 7 | A / C | +1 / – | – / – | – / – | – / – | ++ / – | – / – | – / – | – / – | – / – | – / – | +1 / – | – / – | – / – | – / – | – / – | – / – |
| 14... do | 7A / 7A | A / C | – / – | – / – | – / – | – / – | – / – | – / – | – / – | – / – | – / – | – / – | – / – | +1 / – | – / – | – / – | – / – | ++ / – |
| 15... Gold chloride | 8 / 8 | A / C | – / – | – / – | – / – | – / – | – / – | – / – | – / – | ++ / – | – / – | – / – | – / – | – / – | – / – | – / – | – / – | +1 / – |
| 16... do | 8A / 8A | A / C | ++ / – | – / – | – / – | – / – | +1 / – | – / – | – / – | – / – | – / – | – / – | – / – | – / – | – / – | – / – | – / – | – / – |
| 17... Antimony chloride | 9 / 9 | A / C | – / – | – / – | ++ / – | – / – | – / – | – / – | – / – | – / – | – / – | – / – | +1 / – | +1 / – | – / – | – / – | – / – | +1 / – |
| 18... do | 9A / 9A | A / C | +1 / – | ++ / – | +1 / – | – / – | +1 / – | ++ / – | – / – | – / – | ++ / – | ++ / – | – / – | – / – | – / – | – / – | ++ / – | – / – |
| 19... Bismuth chloride | 10 / 10 | A / C | – / – | – / – | – / – | – / – | +1 / – | – / – | – / – | – / – | – / – | +1 / – | +1 / – | +1 / – | – / – | – / – | – / – | +1 / – |
| 20... do | 10A / 10A | A / C | ++ / – | – / – | – / – | – / – | +1 / – | – / – | – / – | – / – | – / – | – / – | – / – | – / – | – / – | – / – | – / – | +1 / – |

CHART NO. 2—Continued

| Sensitizing agents in triple glass distilled H₂O | Exp. rabbit No. | Method | Cauli-flower | Celery | Cheese (Amer.) | Cherry | Chicken | Chocolate | Cinnamon | Clam | Cloves | Cocoanut | Codfish | Coffee | Corn | Crab | Cucumber | Egg white |
|---|---|---|---|---|---|---|---|---|---|---|---|---|---|---|---|---|---|---|
| 11... Lead chloride | 6 / 6 | A / C | +! / -- | +! / -- | +! / ++ | +! / -- | +! / -- | +! / ++ | +! / ++ | +! / -- | +! / -- | -- / -- | -- / -- | +! / -- | -- / -- | -- / -- | +! / -- | -- / -- |
| 12......do...... | 6A / 6A | A / C | -- / -- | -- / -- | +! / -- | -- / -- | -- / -- | +! / -- | +! / -- | -- / -- | -- / -- | -- / -- | -- / -- | -- / -- | -- / -- | -- / -- | -- / -- | -- / -- |
| 13... Mercuric chloride | 7 / 7 | A / C | -- / -- | +! / -- | +! / -- | -- / -- | +! / -- | +! / -- | +! / -- | -- / -- | -- / -- | -- / -- | -- / -- | +! / -- | -- / -- | -- / -- | -- / -- | -- / -- |
| 14......do...... | 7A / 7A | A / C | -- / -- | -- / -- | +! / -- | -- / -- | -- / -- | +! / -- | +! / -- | +! / -- | -- / -- | -- / -- | -- / -- | -- / -- | -- / -- | -- / -- | +! / -- | -- / -- |
| 15... Gold chloride | 8 / 8 | A / C | -- / -- | +! / -- | +! / -- | -- / -- | +! / -- | +! / -- | +! / -- | -- / -- | -- / -- | -- / -- | -- / -- | -- / -- | -- / -- | -- / -- | -- / -- | -- / -- |
| 16......do...... | 8A / 8A | A / C | -- / -- | -- / -- | +! / -- | -- / -- | +! / -- | ++ / -- | +! / -- | -- / -- | -- / -- | -- / -- | -- / -- | ++ / -- | -- / -- | ++ / -- | +! / -- | +! / -- |
| 17... Antimony chloride | 9 / 9 | A / C | +! / -- | -- / -- | ++ / -- | -- / -- | -- / -- | ++ / -- | ++ / -- | -- / -- | ++ / -- | +! / -- | ++ / -- | +! / -- | -- / -- | -- / -- | ++ / -- | -- / -- |
| 18......do...... | 9A / 9A | A / C | -- / -- | -- / -- | +! / -- | -- / -- | -- / -- | ++ / -- | +! / -- | -- / -- | -- / -- | -- / -- | +! / -- | -- / -- | -- / -- | -- / -- | -- / -- | -- / -- |
| 19... Bismuth chloride | 10 / 10 | A / C | +! / -- | -- / -- | +! / -- | -- / -- | -- / -- | +! / -- | -- / -- | -- / -- | -- / -- | -- / -- | +! / -- | +! / -- | -- / -- | -- / -- | -- / -- | +! / -- |
| 20......do...... | 10A / 10A | A / C | -- / -- | -- / -- | +! / -- | -- / -- | -- / -- | +! / -- | -- / -- | -- / -- | -- / -- | -- / -- | +! / -- | -- / -- | -- / -- | -- / -- | ++ / -- | -- / -- |

| Sensitizing agents triple glass distilled H₂O | Exp. rabbit No. | Method | Egg yolk | English walnut | Garlic | Gelatine | Ginger | Grape | Green pepper | Grape-fruit | Halibut | Herring | Hops | Lamb | Lettuce | Lima bean | Lobster | Mackerel |
|---|---|---|---|---|---|---|---|---|---|---|---|---|---|---|---|---|---|---|
| 11... Lead chloride | 6 / 6 | A / C | +! / -- | -- / -- | -- / -- | +! / -- | +! / -- | +! / -- | +! / -- | +! / -- | +! / -- | +! / -- | -- / -- | -- / -- | -- / -- | -- / -- | -- / -- | +! / -- |
| 12......do...... | 6A / 6A | A / C | -- / -- | ++ / -- | -- / -- | -- / -- | -- / -- | -- / -- | -- / -- | -- / -- | -- / -- | -- / -- | ++ / -- | -- / -- | -- / -- | ++ / -- | ++ / -- | -- / -- |
| 13... Mercuric chloride | 7 / 7 | A / C | +! / -- | +! / -- | -- / -- | -- / -- | +! / -- | ++ / -- | +! / -- | +! / -- | -- / -- | +! / -- | +! / -- | -- / -- | +! / -- | ++ / -- | -- / -- | -- / -- |
| 14......do...... | 7A / 7A | A / C | +! / -- | +! / -- | -- / -- | -- / -- | -- / -- | -- / -- | -- / -- | -- / -- | -- / -- | -- / -- | ++ / -- | -- / -- | +! / -- | +! / -- | -- / -- | -- / -- |
| 15... Gold chloride | 8 / 8 | A / C | +! / -- | +! / -- | -- / -- | +! / -- | -- / -- | ++ / -- | -- / -- | +! / -- | -- / -- | -- / -- | +! / -- | -- / -- | -- / -- | -- / -- | -- / -- | -- / -- |
| 16......do...... | 8A / 8A | A / C | ++ / -- | +! / -- | ++ / -- | -- / -- | ++ / -- | ++ / -- | -- / -- | -- / -- | -- / -- | -- / -- | ++ / -- | -- / -- | -- / -- | -- / -- | ++ / -- | -- / -- |
| 17... Antimony chloride | 9 / 9 | A / C | ++ / -- | ++ / -- | +! / -- | -- / -- | -- / -- | -- / -- | -- / -- | -- / -- | -- / -- | -- / -- | +! / -- | -- / -- | -- / -- | -- / -- | ++ / -- | -- / -- |
| 18......do...... | 9A / 9A | A / C | +! / -- | +! / -- | -- / -- | -- / -- | -- / -- | +! / -- | -- / -- | -- / -- | -- / -- | -- / -- | -- / -- | -- / -- | -- / -- | -- / -- | ++ / -- | +! / -- |
| 19... Bismuth chloride | 10 / 10 | A / C | +! / -- | +! / -- | -- / -- | +! / -- | -- / -- | +! / -- | -- / -- | -- / -- | +! / -- | -- / -- | ++ / -- | -- / -- | -- / -- | -- / -- | ++ / -- | +! / -- |
| 20......do...... | 10A / 10A | A / C | -- / -- | ++ / -- | ++ / -- | +! / -- | -- / -- | -- / -- | -- / -- | -- / -- | -- / -- | -- / -- | -- / -- | -- / -- | -- / -- | +! / -- | +! / -- | -- / -- |

CHART NO. 2—Continued

| Sensitizing agents in triple glass distilled H₂O | Exp. rabbit No. | Method | Malt | Milk (cows) | Milk (goats) | Mushroom | Mustard | Navy bean | Oat | Olive | Onion | Orange | Oyster | Pea | Peach | Peanut | Pear | Pecan |
|---|---|---|---|---|---|---|---|---|---|---|---|---|---|---|---|---|---|---|
| 11... Lead chloride | 6 / 6 | A / C | +1 / -- | -- / -- | +1 / -- | +1 / -- | -- / -- | -- / -- | +1 / -- | -- / -- | +1 / -- | +1 / -- | +1 / -- | +1 / -- | +1 / -- | -- / -- | -- / -- | +1 / -- |
| 12......do......  | 6A / 6A | A / C | -- / -- | -- / -- | -- / -- | -- / -- | ++ / -- | -- / -- | -- / -- | -- / -- | ++ / -- | -- / -- | -- / -- | -- / -- | -- / -- | ++ / +1 | ++ / -- | ++ / -- |
| 13... Mercuric chloride | 7 / 7 | A / C | -- / -- | -- / -- | -- / -- | -- / -- | +1 / -- | -- / -- | -- / -- | -- / -- | +1 / -- | -- / -- | -- / -- | -- / -- | -- / -- | +1 / -- | -- / -- | +1 / -- |
| 14......do......  | 7A / 7A | A / C | -- / -- | -- / -- | -- / -- | -- / -- | +1 / -- | -- / -- | -- / -- | -- / -- | -- / -- | -- / -- | -- / -- | -- / -- | -- / -- | +1 / -- | -- / -- | +1 / -- |
| 15... Gold chloride | 8 / 8 | A / C | -- / -- | -- / -- | -- / -- | -- / -- | -- / -- | +1 / -- | -- / -- | -- / -- | -- / -- | +1 / -- | -- / -- | -- / -- | -- / -- | -- / -- | -- / -- | -- / -- |
| 16......do......  | 8A / 8A | A / C | -- / -- | -- / -- | -- / -- | -- / -- | ++ / -- | -- / -- | -- / -- | -- / -- | ++ / -- | -- / -- | -- / -- | -- / -- | -- / -- | ++ / -- | -- / -- | ++ / -- |
| 17... Antimony chloride | 9 / 9 | A / C | ++ / -- | -- / -- | -- / -- | +1 / -- | ++ / -- | ++ / -- | -- / -- | -- / -- | ++ / -- | -- / -- | -- / -- | -- / -- | -- / -- | ++ / -- | -- / -- | ++ / -- |
| 18......do......  | 9A / 9A | A / C | -- / -- | -- / -- | -- / -- | ++ / -- | ++ / -- | -- / -- | -- / -- | -- / -- | ++ / -- | -- / -- | -- / -- | -- / -- | -- / -- | -- / -- | -- / -- | ++ / -- |
| 19... Bismuth chloride | 10 / 10 | A / C | +1 / -- | -- / -- | +1 / -- | -- / -- | -- / -- | ++ / -- | ++ / -- | -- / -- | -- / -- | +1 / -- | ++ / -- | -- / -- | -- / -- | -- / -- | -- / -- | +1 / -- |
| 20......do......  | 10A / 10A | A / C | +1 / -- | -- / -- | -- / -- | -- / -- | ++ / -- | -- / -- | -- / -- | -- / -- | ++ / -- | -- / -- | -- / -- | -- / -- | -- / -- | +1 / -- | -- / -- | +1 / -- |

| Sensitizing agents in triple glass distilled H₂O | Exp. rabbit No. | Method | Pineapple | Plum | Pork | Potato | Prune | Raspberry | Rhubarb | Rice | Rye | Salmon | Shrimp | Sole (flounder) | Soy bean | Spinach | Squash | Strawberry |
|---|---|---|---|---|---|---|---|---|---|---|---|---|---|---|---|---|---|---|
| 11... Lead chloride | 6 / 6 | A / C | +1 / -- | +1 / -- | -- / -- | +1 / -- | -- / -- | +1 / -- | -- / -- | +1 / -- | +1 / -- | -- / -- | +1 / -- | +1 / -- | -- / -- | +1 / -- | +1 / -- | +1 / -- |
| 12......do......  | 6A / 6A | A / C | -- / -- | -- / -- | -- / -- | ++ / -- | -- / -- | ++ / -- | ++ / -- | -- / -- | -- / -- | ++ / -- | -- / -- | ++ / -- | -- / -- | ++ / -- | -- / -- | -- / -- |
| 13... Mercuric chloride | 7 / 7 | A / C | -- / -- | -- / -- | -- / -- | -- / -- | -- / -- | +1 / -- | -- / -- | -- / -- | -- / -- | +1 / -- | +1 / -- | +1 / -- | +1 / -- | -- / -- | -- / -- | +1 / -- |
| 14......do......  | 7A / 7A | A / C | -- / -- | -- / -- | +1 / -- | -- / -- | -- / -- | +1 / -- | +1 / -- | -- / -- | -- / -- | +1 / -- | +1 / -- | -- / -- | -- / -- | -- / -- | -- / -- | +1 / -- |
| 15... Gold chloride | 8 / 8 | A / C | -- / -- | -- / -- | -- / -- | -- / -- | -- / -- | -- / -- | +1 / -- | -- / -- | -- / -- | +1 / -- | -- / -- | ++ / -- | -- / -- | -- / -- | ++ / -- | -- / -- |
| 16......do......  | 8A / 8A | A / C | -- / -- | -- / -- | -- / -- | -- / -- | -- / -- | ++ / -- | +1 / -- | -- / -- | -- / -- | +1 / -- | -- / -- | ++ / -- | -- / -- | -- / -- | +1 / -- | -- / -- |
| 17... Antimony chloride | 9 / 9 | A / C | -- / -- | -- / -- | -- / -- | -- / -- | -- / -- | -- / -- | ++ / -- | -- / -- | -- / -- | -- / -- | -- / -- | -- / -- | ++ / -- | ++ / -- | -- / -- | -- / -- |
| 18......do......  | 9A / 9A | A / C | -- / -- | -- / -- | -- / -- | ++ / -- | +1 / -- | +1 / -- | +1 / -- | -- / -- | -- / -- | +1 / -- | -- / -- | +1 / -- | -- / -- | +1 / -- | +1 / -- | -- / -- |
| 19... Bismuth chloride | 10 / 10 | A / C | -- / -- | -- / -- | +1 / -- | +1 / -- | +1 / -- | -- / -- | +1 / -- | -- / -- | -- / -- | +1 / -- | -- / -- | +1 / -- | -- / -- | +1 / -- | +1 / -- | -- / -- |
| 20......do......  | 10A / 10A | A / C | -- / -- | -- / -- | +1 / -- | -- / -- | -- / -- | -- / -- | +1 / -- | -- / -- | -- / -- | ++ / -- | -- / -- | ++ / -- | -- / -- | ++ / -- | -- / -- | -- / -- |

CHART NO. 2—Continued

| Sensitizing agents in triple glass distilled H₂O | Exp. rabbit No. | Method | String bean | Sweet potato | Tea | Tomato | Tuna fish | Turkey | Turnip | Veal | Water-melon | Wheat | Yeast (bakers) | Yeast (brewers) | Camel hair | Cat hair | Cattle hair | Cotton |
|---|---|---|---|---|---|---|---|---|---|---|---|---|---|---|---|---|---|---|
| 11... Lead chloride. | 6 / 6 | A / C | -- / -- | +/- / -- | +/- / -- | +/- / -- | +/- / -- | +/- / -- | +/- / -- | +/- / -- | +/- / -- | -- / -- | -- / -- | +/- / -- | -- / -- | -- / -- | -- / -- | -- / -- |
| 12..........do........ | 6A / 6A | A / C | -- / -- | -- / -- | -- / ++ | -- / -- | +/- / -- | -- / -- | -- / -- | -- / ++ | -- / -- | -- / -- | -- / -- | -- / -- | -- / ++ | -- / -- | -- / -- | -- / -- |
| 13... Mercuric chloride. | 7 / 7 | A / C | +/- / -- | -- / -- | +/- / -- | -- / -- | +/- / -- | -- / -- | -- / -- | -- / -- | -- / -- | -- / -- | -- / -- | -- / -- | -- / -- | -- / -- | -- / -- | -- / -- |
| 14..........do........ | 7A / 7A | A / C | -- / -- | -- / -- | +/- / -- | -- / -- | +/- / -- | +/- / -- | -- / -- | +/- / -- | -- / -- | -- / -- | -- / -- | -- / -- | -- / -- | -- / -- | -- / -- | -- / -- |
| 15... Gold chloride. | 8 / 8 | A / C | -- / -- | -- / -- | -- / -- | +/- / -- | -- / -- | +/- / -- | -- / -- | -- / -- | -- / -- | -- / -- | -- / -- | -- / -- | -- / -- | -- / -- | -- / -- | -- / -- |
| 16..........do........ | 8A / 8A | A / C | ++ / -- | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |
| 17... Antimony chloride. | 9 / 9 | A / C | -- / -- | -- / -- | +/- / -- | -- / -- | ++ / -- | ++ / -- | -- / -- | -- / -- | -- / -- | -- / -- | -- / -- | -- / -- | -- / -- | -- / -- | -- / -- | -- / -- |
| 18..........do........ | 9A / 9A | A / C | +/- / -- | -- / -- | +/- / -- | -- / -- | -- / ++ | ++ / -- | -- / -- | -- / -- | -- / -- | -- / -- | -- / -- | -- / -- | -- / -- | -- / -- | -- / -- | -- / -- |
| 19... Bismuth chloride. | 10 / 10 | A / C | -- / -- | -- / -- | +/- / -- | -- / -- | ++ / -- | +/- / -- | -- / -- | -- / -- | -- / -- | -- / -- | -- / -- | -- / -- | -- / -- | -- / -- | +/- / -- | -- / -- |
| 20..........do........ | 10A / 10A | A / C | -- / -- | -- / -- | +/- / -- | -- / -- | ++ / ++ | -- / -- | -- / -- | -- / -- | -- / -- | -- / -- | -- / -- | -- / -- | -- / -- | -- / -- | -- / -- | -- / -- |

| Sensitizing agents in triple glass distilled H₂O | Exp. rabbit No. | Method | Cotton-seed | Dog Hair | Feathers (mix) | Flaxseed | Furs (mixed) | Glue | Goat Hair | Grain Mill Dust | Henna | Hog Hair | Horse Dander | House Dust | Human Hair | Jute | Kapok | Karaya Gum |
|---|---|---|---|---|---|---|---|---|---|---|---|---|---|---|---|---|---|---|
| 11... Lead chloride. | 6 / 6 | A / C | -- / -- | -- / -- | -- / -- | -- / -- | -- / -- | -- / -- | -- / -- | -- / -- | +/- / -- | -- / -- | -- / -- | +/- / -- | -- / -- | -- / -- | +/- / -- | +/- / -- |
| 12..........do........ | 6A / 6A | A / C | +/- / -- | -- / -- | -- / ++ | -- / -- | -- / -- | -- / -- | -- / -- | -- / -- | -- / -- | -- / -- | -- / -- | -- / -- | -- / -- | -- / -- | -- / -- | -- / -- |
| 13... Mercuric chloride. | 7 / 7 | A / C | +/- / -- | -- / -- | -- / -- | -- / -- | -- / -- | -- / -- | -- / -- | -- / -- | +/- / -- | -- / -- | -- / -- | -- / -- | -- / -- | -- / -- | -- / -- | -- / -- |
| 14..........do........ | 7A / 7A | A / C | -- / -- | -- / -- | -- / -- | -- / -- | -- / -- | -- / -- | -- / -- | -- / -- | ++ / -- | -- / -- | -- / -- | -- / -- | -- / -- | -- / -- | -- / -- | -- / -- |
| 15... Gold chloride. | 8 / 8 | A / C | ++ / -- | -- / -- | -- / -- | -- / -- | -- / -- | +/- / -- | -- / -- | -- / -- | -- / -- | -- / -- | -- / -- | -- / -- | -- / -- | -- / -- | -- / -- | -- / -- |
| 16..........do........ | 8A / 8A | A / C | ++ / -- | -- / -- | -- / -- | -- / -- | -- / -- | -- / -- | -- / -- | -- / -- | ++ / -- | -- / -- | -- / -- | -- / -- | -- / -- | -- / -- | -- / -- | -- / -- |
| 17... Antimony chloride. | 9 / 9 | A / C | -- / -- | -- / -- | -- / -- | +/- / -- | -- / -- | -- / -- | -- / -- | -- / -- | -- / -- | -- / -- | -- / -- | -- / -- | -- / -- | -- / -- | -- / -- | -- / -- |
| 18..........do........ | 9A / 9A | A / C | ++ / -- | -- / -- | -- / -- | -- / -- | -+ / -- | -- / -- | ++ / -- | -- / -- | ++ / -- | -- / -- | -- / -- | -- / -- | -- / -- | -- / -- | -- / -- | -- / -- |
| 19... Bismuth chloride. | 10 / 10 | A / C | +/- / -- | -- / -- | -- / -- | -- / -- | +/- / -- | -- / -- | -- / -- | -- / -- | +/- / -- | -- / -- | -- / -- | -- / -- | -- / -- | -- / -- | -- / -- | -- / -- |
| 20..........do........ | 10A / 10A | A / C | ++ / -- | -- / -- | -- / -- | -- / -- | -- / -- | -- / -- | -- / -- | -- / -- | -- / -- | -- / -- | -- / -- | -- / -- | ++ / -- | -- / -- | -- / -- | -- / -- |

CHART NO. 2—Continued

| Sensitizing agents in triple glass distilled H₂O | Exp. rabbit No. | Method | Kleenex | Newsprint mix | Orris root | Pyrethium | Rabbit hair | Rayon | Sheep wool | Silk | Sisal | Tobacco | Smoke | Upholstery dust | Alternaria | Aspergillus (mix) | Chaetomium | Helminthosporium |
|---|---|---|---|---|---|---|---|---|---|---|---|---|---|---|---|---|---|---|
| 11. Lead chloride | 6 | A C | +− +− | −− −− | +− −− | +− −− | +− −− | −− −− | −− −− | +− −− | +− −− | +− −− | +− −− | +− −− | −− −− | +− −− | +− −− | +− −− |
| 12. do | 6A | A C | −− −− | −− −− | −− −− | −− −− | −− −− | −− −− | −− −− | −− −− | −− −− | −− −− | −− −− | −− −− | −− −− | −− −− | −− −− | −− −− |
| 13. Mercuric chloride | 7 | A C | −− −− | −− −− | −− −− | −− −− | −− −− | −− −− | −− −− | −− −− | −− −− | −− −− | +− −− | −− −− | −− −− | −− −− | −− −− | −− −− |
| 14. do | 7A | A C | −− −− | −− −− | −− −− | −− −− | −− −− | −− −− | −− −− | −− −− | −− −− | −− −− | +− −− | −− −− | −− −− | −− −− | −− −− | −− −− |
| 15. Gold chloride | 8 | A C | −− −− | −− −− | −− −− | −− −− | −− −− | −− −− | −− −− | −− −− | −− −− | −− −− | −− −− | −− −− | −− −− | −− −− | −− −− | −− −− |
| 16. do | 8A | A C | −− −− | −− −− | −− −− | −− −− | −− −− | −− −− | −− −− | −− −− | −− −− | −− −− | −− −− | −− −− | −− −− | −− −− | −− −− | −− −− |
| 17. Antimony chloride | 9 | A C | −− −− | −− −− | −− −− | −− −− | −− −− | −− −− | −− −− | −− −− | −− −− | −− −− | −− −− | −− −− | −− −− | −− −− | −− −− | −− −− |
| 18. do | 9A | A C | −− −− | −− −− | −− −− | −− −− | −− −− | −− −− | −− −− | −− −− | −− −− | −− −− | −− −− | −− −− | −− −− | −− −− | −− −− | −− −− |
| 19. Bismuth chloride | 10 | A C | −− −− | −− −− | −− −− | −− −− | −− −− | −− −− | −− −− | −− −− | −− −− | −− −− | −− −− | −− −− | −− −− | −− −− | −− −− | −− −− |
| 20. do | 10A | A C | −− −− | −− −− | −− −− | −− −− | −− −− | −− −− | −− −− | −− −− | −− −− | −− −− | −− −− | −− −− | −− −− | −− −− | −− −− | −− −− |

| Sensitizing agents in triple glass distilled H₂O | Exp. rabbit No. | Method | Hormodendrum | Monilia | Mucor | Penicillium (mix) | Rhizopus | Trichophyton | Alnus incana | Fraxinus americana | Fagus grandifolia | Betula nigra | Acer negundo | Populus deltoides | Ulmus americana | Hicoria ovata | Acer saccharum | Quercus alba |
|---|---|---|---|---|---|---|---|---|---|---|---|---|---|---|---|---|---|---|
| 11. Lead chloride | 6 | A C | +− −− | −− −− | +− −− | +− −− | +− −− | −− −− | +− −− | +− −− | +− −− | +− −− | +− −− | −− −− | +− −− | −− −− | −− −− | −− −− |
| 12. do | 6A | A C | −− −− | −− −− | −− −− | −− −− | −− −− | −− −− | ++ −− | −− −− | −− −− | −− −− | ++ −− | ++ −− | −− −− | −− −− | ++ −− | ++ −− |
| 13. Mercuric chloride | 7 | A C | −− −− | −− −− | −− −− | −− −− | −− −− | −− −− | −− −− | −− −− | −− −− | −− −− | −− −− | −− −− | −− −− | −− −− | −− −− | −− −− |
| 14. do | 7A | A C | −− −− | −− −− | −− −− | −− −− | −− −− | −− −− | −− −− | −− −− | −− −− | −− −− | −− −− | −− −− | −− −− | −− −− | −− −− | −− −− |
| 15. Gold chloride | 8 | A C | −− −− | −− −− | −− −− | −− −− | −− −− | −− −− | −− −− | −− −− | −− −− | −− −− | −− −− | −− −− | −− −− | −− −− | −− −− | −− −− |
| 16. do | 8A | A C | −− −− | −− −− | −− −− | −− −− | −− −− | −− −− | −− −− | −− −− | −− −− | −− −− | −− −− | −− −− | −− −− | −− −− | −− −− | −− −− |
| 17. Antimony chloride | 9 | A C | −− −− | −− −− | −− −− | −− −− | −− −− | −− −− | −− −− | −− −− | −− −− | −− −− | −− −− | −− −− | −− −− | −− −− | −− −− | −− −− |
| 18. do | 9A | A C | −− −− | −− −− | −− −− | −− −− | −− −− | −− −− | −− −− | −− −− | −− −− | −− −− | −− −− | −− −− | −− −− | −− −− | −− −− | −− −− |
| 19. Bismuth chloride | 10 | A C | −− −− | −− −− | −− −− | −− −− | −− −− | −− −− | −− −− | −− −− | −− −− | −− −− | −− −− | −− −− | −− −− | −− −− | −− −− | −− −− |
| 20. do | 10A | A C | −− −− | −− −− | −− −− | −− −− | −− −− | −− −− | −− −− | −− −− | −− −− | −− −− | −− −− | −− −− | −− −− | −− −− | −− −− | −− −− |

CHART NO. 2—Continued

| Sensitizing agents in triple glass distilled H₂O | Exp. rabbit No. | Method | Platanus accidentatis | Juglans nigra | Salix nigra | Poa compresso | Bromus inermis | Festuca elatior | Poa pratensis | Doctylis glomerata | Agropyron repens | Agrostis alba | Lolium perenne | Anthoranthum andoratum | Phleum pratense | Holcus lanatus | Xanthium candenso | Taraxacum officinale |
|---|---|---|---|---|---|---|---|---|---|---|---|---|---|---|---|---|---|---|
| 11 Lead chloride | 6 | A | +– | – – | +– | +– | +– | +– | – – | – – | +– | +– | – – | – – | – – | +– | +– | – – |
|   | 6 | C | – – | – – | – – | – – | – – | – – | – – | – – | – – | – – | – – | – – | – – | – – | – – | – – |
| 12 do | 6A | A | ++ | – – | ++ | – – | – – | ++ | ++ | ++ | – – | – – | – – | – – | ++ | ++ | ++ | ++ |
|   | 6A | C | – – | – – | – – | – – | – – | – – | – – | – – | – – | – – | – – | – – | – – | – – | – – | – – |
| 13 Mercuric chloride | 7 | A | – – | – – | +– | – – | – – | – – | – – | – – | – – | – – | – – | – – | – – | – – | – – | – – |
|   | 7 | C | – – | – – | – – | – – | – – | – – | – – | – – | – – | – – | – – | – – | – – | – – | – – | – – |
| 14 do | 7A | A | +– | – – | – – | – – | – – | – – | – – | – – | – – | – – | – – | – – | – – | – – | – – | – – |
|   | 7A | C | – – | – – | – – | – – | – – | – – | – – | – – | – – | – – | – – | – – | – – | – – | – – | – – |
| 15 Gold chloride | 8 | A | – – | – – | – – | – – | – – | – – | – – | – – | – – | – – | – – | – – | – – | – – | – – | – – |
|   | 8 | C | – – | – – | – – | – – | – – | – – | – – | – – | – – | – – | – – | – – | – – | – – | – – | – – |
| 16 do | 8A | A | – – | – – | – – | – – | – – | – – | – – | – – | – – | – – | – – | – – | – – | – – | – – | – – |
|   | 8A | C | – – | – – | – – | – – | – – | – – | – – | – – | – – | – – | – – | – – | – – | – – | – – | – – |
| 17 Antimony chloride | 9 | A | +– | – – | – – | – – | – – | – – | – – | – – | – – | – – | – – | – – | – – | – – | – – | – – |
|   | 9 | C | – – | – – | – – | – – | – – | – – | – – | – – | – – | – – | – – | – – | – – | – – | – – | – – |
| 18 do | 9A | A | – – | – – | – – | – – | – – | – – | – – | – – | – – | – – | – – | – – | – – | – – | – – | – – |
|   | 9A | C | – – | – – | – – | – – | – – | – – | – – | – – | – – | – – | – – | – – | – – | – – | – – | – – |
| 19 Bismuth chloride | 10 | A | – – | – – | – – | – – | – – | – – | – – | – – | – – | – – | – – | – – | – – | – – | – – | – – |
|   | 10 | C | – – | – – | – – | – – | – – | – – | – – | – – | – – | – – | – – | – – | – – | – – | – – | – – |
| 20 do | 10A | A | +– | – – | ++ | – – | – – | – – | – – | – – | – – | – – | – – | – – | – – | – – | – – | – – |
|   | 10A | C | – – | – – | – – | – – | – – | – – | – – | – – | – – | – – | – – | – – | – – | – – | – – | – – |

| Sensitizing agents in triple glass distilled H₂O | Exp. rabbit No. | Method | Rumex crispus | Golden rod | Kochia scoparia | Chenopodium alba | Iva ciliata | Ameranthus retroflexus | Plantago lanceolata | Ambrosia trifida | Ambrosia elatior | Rumex acetosella | House dust | Control |
|---|---|---|---|---|---|---|---|---|---|---|---|---|---|---|
| 11 Lead chloride | 6 | A | – – | +– | +– | +– | +– | +– | +– | – – | +– | +– | +– | – – |
|   | 6 | C | – – | – – | – – | – – | – – | – – | – – | – – | – – | – – | – – | – – |
| 12 do | 6A | A | ++ | – – | ++ | ++ | ++ | ++ | ++ | – – | – – | – – | – – | – – |
|   | 6A | C | – – | – – | – – | – – | – – | – – | – – | – – | – – | – – | – – | – – |
| 13 Mercuric chloride | 7 | A | – – | – – | – – | – – | – – | – – | – – | – – | – – | – – | – – | – – |
|   | 7 | C | – – | – – | – – | – – | – – | – – | – – | – – | – – | – – | – – | – – |
| 14 do | 7A | A | – – | – – | – – | – – | – – | – – | – – | – – | – – | – – | – – | – – |
|   | 7A | C | – – | – – | – – | – – | – – | – – | – – | – – | – – | – – | – – | – – |
| 15 Gold chloride | 8 | A | – – | – – | – – | – – | – – | – – | – – | – – | – – | – – | – – | – – |
|   | 8 | C | – – | – – | – – | – – | – – | – – | – – | – – | – – | – – | – – | – – |
| 16 do | 8A | A | – – | – – | – – | – – | ++ | – – | – – | – – | – – | – – | – – | – – |
|   | 8A | C | – – | – – | – – | – – | – – | – – | – – | – – | – – | – – | – – | – – |
| 17 Antimony chloride | 9 | A | – – | – – | – – | – – | – – | – – | – – | – – | – – | – – | – – | – – |
|   | 9 | C | – – | – – | – – | – – | – – | – – | – – | – – | – – | – – | – – | – – |
| 18 do | 9A | A | – – | – – | – – | – – | – – | – – | – – | – – | – – | – – | – – | – – |
|   | 9A | C | – – | – – | – – | – – | – – | – – | – – | – – | – – | – – | – – | – – |
| 19 Bismuth chloride | 10 | A | – – | – – | – – | – – | – – | – – | – – | – – | – – | – – | – – | – – |
|   | 10 | C | – – | – – | – – | – – | – – | – – | – – | – – | – – | – – | – – | – – |
| 20 do | 10A | A | – – | – – | – – | – – | – – | – – | – – | – – | – – | – – | – – | – – |
|   | 10A | C | – – | – – | – – | – – | – – | – – | – – | – – | – – | – – | – – | – – |

CHART NO. 3

[Effect of cadmium and nickelous ions]

| Sensitizing agents in triple glass distilled H₂O | Exp. rabbit No. | Method | Almond | Apple | Apricot | Arrowroot | Asparagus | Banana | Barley | Beef | Beet | Black pepper | Brazil nut | Broccoli | Buckwheat | Cabbage | Cantaloupe | Carrot |
|---|---|---|---|---|---|---|---|---|---|---|---|---|---|---|---|---|---|---|
| 21... Cadmium chloride | 11 / 11 | A / C | -- / -- | ++ / -- | ++ / -- | -- / -- | -- / -- | -- / -- | +! / -- | -- / -- | ++ / -- | -- / -- | -- / -- | -- / -- | -- / -- | -- / -- | -- / -- | -- / -- |
| 22.......do........ | 11A / 11A | A / C | -- / -- | -- / -- | ++ / ++ | -- / -- | -- / -- | -- / -- | -- / -- | -- / -- | -- / -- | -- / -- | -- / -- | -- / -- | -- / -- | -- / -- | -- / -- | -- / -- |
| 23... Nickelous chloride | 12 / 12 | A / C | -- / -- | -- / -- | -- / -- | -- / -- | ++ / -- | -- / -- | -- / -- | -- / -- | -- / -- | -- / -- | ++ / -- | -- / -- | -- / -- | -- / -- | -- / -- | +! / -- |
| 24.......do........ | 12A / 12A | A / C | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- | -- / -- |

| Sensitizing agents in triple glass distilled H₂O | Exp. rabbit No. | Method | Cauliflower | Celery | Cheese (Amer.) | Cherry | Chicken | Chocolate | Cinnamon | Clam | Cloves | Cocoanut | Codfish | Coffee | Corn | Crab | Cucumber | Egg white |
|---|---|---|---|---|---|---|---|---|---|---|---|---|---|---|---|---|---|---|
| 21... Cadmium chloride | 11 / 11 | A / C | -- / -- | ++ / -- | ++ / ++ | -- / -- | ++ / -- | ++ / -- | +! / -- | -- / -- | ++ / -- | -- / -- | -- / -- | +! / -- | -- / -- | -- / -- | -- / -- | -- / -- |
| 22.......do........ | 11A / 11A | A / C | -- / -- | -- / -- | ++ / -- | -- / -- | +! / -- | +! / -- | ++ / -- | -- / -- | -- / -- | ++ / -- | -- / -- | -- / -- | -- / -- | ++ / -- | -- / -- | -- / -- |
| 23... Nickelous chloride | 12 / 12 | A / C | -- / -- | ++ / -- | +! / -- | -- / -- | -- / -- | ++ / -- | -- / -- | -- / -- | -- / -- | -- / -- | +! / -- | +! / -- | -- / -- | -- / -- | +! / -- | -- / -- |
| 24.......do........ | 12A / 12A | A / C | -- / -- | -- / -- | +! / -- | -- / -- | -- / -- | ++ / -- | ++ / -- | -- / -- | ++ / -- | -- / -- | -- / -- | -- / -- | -- / -- | -- / -- | -- / -- | -- / -- |

| Sensitizing agents in triple glass distilled H₂O | Exp. rabbit No. | Method | Egg yolk | English walnut | Garlic | Gelatine | Ginger | Grape | Grapefruit | Halibut | Herring | Hops | Lamb | Lettuce | Lima bean | Lobster | Mackerel |
|---|---|---|---|---|---|---|---|---|---|---|---|---|---|---|---|---|---|
| 21... Cadmium chloride | 11 / 11 | A / C | ++ / ++ | ++ / -- | ++ / -- | +! / -- | ++ / -- | +! / -- | +! / -- | -- / -- | -- / -- | ++ / -- | -- / -- | -- / -- | ++ / -- | -- / -- | ++ / -- |
| 22.......do........ | 11A / 11A | A / C | ++ / -- | -- / -- | ++ / -- | -- / -- | -- / -- | -- / -- | +! / -- | -- / -- | -- / -- | +! / -- | -- / -- | -- / -- | -- / -- | -- / -- | -- / -- |
| 23... Nickelous chloride | 12 / 12 | A / C | +! / -- | ++ / -- | ++ / -- | -- / -- | -- / -- | -- / -- | -- / -- | -- / -- | -- / -- | -- / -- | -- / -- | -- / -- | +! / -- | +! / -- | -- / -- |
| 24.......do........ | 12A / 12A | A / C | ++ / -- | -- / -- | -- / -- | -- / -- | -- / -- | -- / -- | -- / -- | -- / -- | -- / -- | ++ / -- | -- / -- | -- / -- | -- / -- | -- / -- | -- / -- |

| Sensitizing agents in triple glass distilled H₂O | Exp. rabbit No. | Method | Malt | Milk (cows) | Milk (goats) | Mushroom | Mustard | Navy bean | Oat | Olive | Onion | Orange | Oyster | Pea | Peach | Peanut | Pear | Pecan |
|---|---|---|---|---|---|---|---|---|---|---|---|---|---|---|---|---|---|---|
| 21... Cadmium chloride | 11 / 11 | A / C | -- / -- | -- / -- | -- / -- | -- / -- | ++ / -- | -- / -- | -- / -- | -- / -- | +! / -- | -- / -- | -- / -- | -- / -- | -- / -- | +! / -- | -- / -- | +! / -- |
| 22.......do........ | 11A / 11A | A / C | -- / -- | -- / -- | -- / -- | -- / -- | ++ / ++ | -- / -- | -- / -- | -- / -- | -- / -- | -- / -- | -- / -- | -- / -- | -- / -- | ++ / +! | -- / -- | ++ / ++ |
| 23... Nickelous chloride | 12 / 12 | A / C | -- / -- | -- / -- | -- / -- | -- / -- | -- / -- | -- / -- | -- / -- | -- / -- | -- / -- | -- / -- | -- / -- | -- / -- | -- / -- | +! / -- | -- / -- | ++ / -- |
| 24.......do........ | 12A / 12A | A / C | -- / -- | -- / -- | -- / -- | -- / -- | +! / -- | -- / -- | -- / -- | -- / -- | -- / -- | -- / -- | -- / -- | -- / -- | -- / -- | -- / -- | -- / -- | -- / -- |

CHART NO. 3—Continued

| Sensitizing agents in triple glass distilled H₂O | Exp. rabbit No. | Method | Pineapple | Plum | Pork | Potato | Prune | Rasp-berry | Rhubarb | Rice | Rye | Salmon | Shrimp | Sole (flounder) | Soy bean | Spinach | Squash | Straw-berry |
|---|---|---|---|---|---|---|---|---|---|---|---|---|---|---|---|---|---|---|
| 21... Cadmium chloride. | 11 / 11 | A / C | -/- | -/- | -/- | -/- | -/- | -/- | +/- | -/- | -/- | +/- | -/- | -/- | +/- | -/- | -/- | -/- |
| 22........do........ | 11A / 11A | A / C | -/- | -/- | ++/- | -/- | +/- | -/- | ++/- | -/- | -/- | ++/- | -/- | ++/- | -/- | ++/- | -/- | +/- |
| 23... Nickelous chloride. | 12 / 12 | A / C | -/- | -/- | -/- | -/- | -/- | -/- | +/- | -/- | -/- | ++/- | +/- | +/- | +/- | +/- | +/- | +/- |
| 24........do........ | 12A / 12A | A / C | -/- | -/- | -/- | -/- | -/- | +/- | ++/- | -/- | -/- | +/- | -/- | -/- | -/- | -/- | -/- | +/- |

| Sensitizing agents in triple glass distilled H₂O | Exp. rabbit No. | Method | String bean | Sweet potato | Tea | Tomato | Tuna fish | Turkey | Turnip | Veal | Water-melon | Wheat | Yeast (bakers) | Yeast (brewers) | Camel hair | Cat hair | Cattle hair | Cotton |
|---|---|---|---|---|---|---|---|---|---|---|---|---|---|---|---|---|---|---|
| 21... Cadmium chloride. | 11 / 11 | A / C | -/- | -/- | +/- | -/- | -/- | +/- | -/- | +/- | -/- | -/- | -/- | -/- | -/- | -/- | -/- | -/- |
| 22........do........ | 11A / 11A | A / C | -/- | -/- | +/- | -/- | -/- | +/- | -/- | -/- | -/- | -/- | -/- | -/- | -/- | -/- | -/- | -/- |
| 23... Nickelous chloride. | 12 / 12 | A / C | +/- | -/- | -/- | -/- | +/- | +/- | -/- | +/- | -/- | -/- | -/- | -/- | -/- | -/- | -/- | -/- |
| 24........do........ | 12A / 12A | A / C | -/- | -/- | -/- | -/- | +/- | +/- | -/- | -/- | -/- | -/- | -/- | -/- | -/- | -/- | -/- | -/- |

| Sensitizing agents in triple glass distilled H₂O | Exp. rabbit No. | Method | Cotton-seed | Dog hair | Feathers (mix) | Flaxseed | Furs (mixed) | Glue | Goat hair | Grain mill dust | Henna | Hog hair | Horse dander | House dust | Human hair | Jute | Kapok | Karaya gum |
|---|---|---|---|---|---|---|---|---|---|---|---|---|---|---|---|---|---|---|
| 21... Cadmium chloride. | 11 / 11 | A / C | +/- | -/- | -/- | -/- | -/- | -/- | -/- | -/- | +/- | -/- | -/- | -/- | -/- | -/- | -/- | -/- |
| 22........do........ | 11A / 11A | A / C | -/- | -/- | -/- | -/- | -/- | -/- | -/- | -/- | ++/- | -/- | -/- | -/- | -/- | -/- | -/- | -/- |
| 23... Nickelous chloride. | 12 / 12 | A / C | ++/- | -/- | -/- | -/- | -/- | -/- | -/- | -/- | ++/- | -/- | -/- | -/- | -/- | -/- | -/- | -/- |
| 24........do........ | 12A / 12A | A / C | -/- | -/- | -/- | -/- | -/- | -/- | -/- | -/- | +/- | -/- | -/- | -/- | -/- | -/- | -/- | -/- |

| Sensitizing agents in triple glass distilled H₂O | Exp. rabbit No. | Method | Kleenex | Newsprint mix | Orris root | Pyre-thrum | Rabbit hair | Rayon | Sheep wool | Silk | Sisal | Tobacco | Smoke | Uphol-stery dust | Alter-naria | Aspergil-lus (mix) | Chaeto-mium | Helmin-thospo-rium |
|---|---|---|---|---|---|---|---|---|---|---|---|---|---|---|---|---|---|---|
| 21... Cadmium chloride. | 11 / 11 | A / C | -/- | -/- | -/- | -/- | -/- | -/- | -/- | -/- | -/- | -/- | -/- | -/- | -/- | -/- | -/- | -/- |
| 22........do........ | 11A / 11A | A / C | -/- | -/- | -/- | -/- | -/- | -/- | -/- | -/- | -/- | -/- | -/- | -/- | -/- | -/- | -/- | -/- |
| 23... Nickelous chloride. | 12 / 12 | A / C | -/- | -/- | -/- | -/- | -/- | -/- | -/- | -/- | -/- | -/- | -/- | -/- | -/- | -/- | -/- | -/- |
| 24........do........ | 12A / 12A | A / C | -/- | -/- | -/- | +/- | -/- | -/- | -/- | -/- | -/- | -/- | -/- | -/- | -/- | -/- | -/- | -/- |

CHART NO. 3—Continued

| Sensitizing agents in distilled H₂O | Exp. rabbit No. | Method | Hormodendrum | Monilia | Mucor | Penicillium (mix) | Rhizopus | Trichophyton | Alnus incana | Fraxinus americana | Fagus grandifolia | Betula nigra | Acer negundo | Populus deltoides | Ulmus americano | Hicoria ovata | Acer saccharum | Quercus alba |
|---|---|---|---|---|---|---|---|---|---|---|---|---|---|---|---|---|---|---|
| 21... Cadmium chlorido. | 11<br>11 | A<br>C | −<br>− | −<br>− | −<br>− | −<br>− | −<br>− | −<br>− | −<br>− | −<br>− | −<br>− | −<br>− | +<br>− | −<br>− | −<br>− | −<br>− | −<br>− | −<br>− |
| 22......do...... | 11A<br>11A | A<br>C | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− |
| 23... Nickelous chloride. | 12<br>12 | A<br>C | −<br>− | −<br>− | −<br>− | −<br>− | −<br>− | −<br>− | −<br>− | −<br>− | −<br>− | −<br>− | +<br>− | +<br>− | −<br>− | −<br>− | −<br>− | −<br>− |
| 24......do...... | 12A<br>12A | A<br>C | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− |

| Sensitizing agents in triple glass distilled H₂O | Exp. rabbit No. | Method | Platanus accidentalis | Juglans nigra | Salix nigra | Poa compresso | Bromus inermis | Festuca elatori | Tri- Golden rod | Poa pratensis | Doctylis glomerata | Agropyron repens | Agrostis alba | Amaranthus retroflexus | Lolium perenne | Anthoxanthum adoratum | Phleum pratense | Holcus ianatus | Xanthium canadenso | Taraxacum officinale |
|---|---|---|---|---|---|---|---|---|---|---|---|---|---|---|---|---|---|---|---|---|
| 21... Cadmium chlorido. | 11<br>11 | A<br>C | +<br>− | −<br>− | +<br>− | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− |
| 22......do...... | 11A<br>11A | A<br>C | +<br>− | −<br>− | +<br>+ | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− |
| 23... Nickelous chloride. | 12<br>12 | A<br>C | +<br>− | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− | −<br>− |
| 24......do...... | 12A<br>12A | A<br>C | −<br>− | −<br>− | −<br>− | +<br>− | −<br>− | −<br>− | −<br>− | −<br>− | −<br>− | −<br>− | −<br>− | −<br>− | −<br>− | −<br>− | −<br>− | −<br>− | −<br>− | −<br>− |

| Sensitizing agents in triple glass distilled H₂O | Exp. rabbit No. | Method | Chenopodium alba | Kochia scoparia | Iva ciliata | Rumex crispus | Plantago lanceolata | Ambrosia trifida | Ambrosia elatior | Rumex acetosella | House dust | Control |
|---|---|---|---|---|---|---|---|---|---|---|---|---|
| 21.... Cadmium chloride | 11<br>11 | A<br>C | −<br>− | −<br>− | −<br>− | −<br>− | −<br>− | −<br>− | −<br>− | −<br>− | −<br>− | −<br>− |
| 22.............do............ | 11A<br>11A | A<br>C | −<br>− | −<br>− | −<br>− | −<br>− | −<br>− | −<br>− | −<br>− | −<br>− | −<br>− | −<br>− |
| 23.... Nickelous chloride | 12<br>12 | A<br>C | −<br>− | −<br>− | −<br>− | −<br>− | −<br>− | −<br>− | −<br>− | −<br>− | −<br>− | −<br>− |
| 24.............do............ | 12A<br>12A | A<br>C | −<br>− | −<br>− | −<br>− | −<br>− | −<br>− | −<br>− | −<br>− | −<br>− | −<br>− | −<br>− |

CHART NO. 4

| Heavy (0.01%) metal chlorides in triple glass distilled water | Ala-nine | Valine | Leu-cine | Iso-leu-cine | Phen-yl-aline | Tyro-sine | Pro-line | Hy-droxy-proline | Serine | Thre-onine | Cys-teine | Cys-tine | Methio-nina | Trypto-phan |
|---|---|---|---|---|---|---|---|---|---|---|---|---|---|---|
| Copper | − | − | + | + | + | − | − | + | + | − | + | + | + | + |
| Cobalt | − | − | + | − | + | − | − | − | + | + | + | + | + | + |
| Manganese | − | − | − | − | − | − | − | − | − | − | − | − | − | − |
| Iron | − | − | − | − | − | − | − | − | − | − | − | − | − | − |
| Zinc | + | − | − | − | − | + | − | + | + | + | − | + | − | − |
| Lead | + | − | − | − | − | − | + | − | − | − | − | + | − | − |
| Mercury (ic) | − | − | − | − | − | − | − | − | − | − | − | − | − | − |
| Gold | + | cc, + | + | − | + | cc, + | cc, + | cc, + | − | − | + | + | − | cc, + |
| Antimony | + | + | − | − | − | − | − | − | + | − | + | + | − | − |
| Bismuth | + | − | − | − | − | − | − | − | − | − | − | − | − | − |
| Cadmium | + | − | − | − | − | − | + | − | + | − | + | + | + | + |
| Nickel | − | − | − | − | − | − | − | − | − | − | − | − | − | − |

| Heavy (0.01%) metal chlorides in triple glass distilled water | Aspar-tic acid | Glu-tomic acid | Arginine (mono-hydro-chloride) | Ly-sine | Histi-dine | Thy-roxine | Diiodo-tyro-sine | Hy-droxy-lysine | Cit-rul-line | Can-ava-nine | B-Z thienyl-alanine | Glu-ta-mine | L-as-para-gine |
|---|---|---|---|---|---|---|---|---|---|---|---|---|---|
| Copper | + | + | − | + | − | + | + | − | − | − | + | + | − |
| Cobalt | + | + | + | + | cc, + | + | + | + | + | − | + | + | − |
| Manganese | − | − | − | − | − | − | − | − | − | − | − | − | − |
| Iron | − | − | − | − | − | + | − | − | + | + | − | + | + |
| Zinc | − | + | − | − | − | + | + | − | + | + | + | + | − |
| Lead | − | − | − | − | − | + | − | − | + | + | − | + | + |
| Mercury (ic) | − | − | − | − | − | + | − | − | + | + | − | + | + |
| Gold | cc, + | − | − | cc, + | − | − | − | − | + | − | − | + | + |
| Antimony | + | − | − | − | − | + | − | − | − | − | − | − | − |
| Bismuth | − | − | − | − | − | − | − | − | − | − | − | − | − |
| Cadmium | + | − | − | − | − | + | + | + | − | + | + | + | − |
| Nickel | − | + | − | − | − | + | − | − | − | − | − | − | − | cc = Color change which indicates a positive reaction.
(+) Positive, (−) Negative.

EXAMPLE 2

After completing the above test work in the sensitized rabbits, one rabbit of each group was given a shot of secretin manufactured by Boots, London, England, in an amount of 4 micrograms per kilogram of body weight. After 24 hours, a blood sample was extracted from the midvein of the ear of each rabbit and allowed to coagulate. The erothrocyte free serum was mixed with a specific reactive antigen and heated for 1 hour in a water bath at 51–56° C. At the end of the hour the test samples were examined. The secretin-treated serum samples were negative; i.e., no precipitation occurred between antigen and treated serum, except for two of the samples which remained positive. The control was negative. The two secretin-treated rabbits which remained positive were given a second shot of secretin and rechecked 24 hours later. These became negative also after the second shot of secretin.

The remainder of the untreated rabbits were checked by the same method. All the blood samples remained positive, that is, they showed precipitation between serum and antigen.

EXAMPLE 3

After completion of all blood work, the 24 rabbits were sacrificed and tissue samples were fixed in 10% formalin which is a universal fixative for histological purposes. Samples 1 cm. thick were processed by means of an autotechnicon. This machine is comprised of beakers containing different solutions and operated by a timing mechanism which advances the carrier at a specified time into the next beaker of solution. The tissues were dehydrated in 95% alcohol, absolute alcohol and acetone. The clearing agent used was xylene. All soutions were spectrographically pure to prevent contamination. The tissue samples were then infiltrated with paraffin. The tissue samples were then taken from the paraffin one at a time and embedded in additional paraffin in paper boats and labeled. After the paraffin had solidified, the blocks of tissue were trimmed of excess paraffin and then affixed to an object holder. The assembled unit was put into the freezer of the refrigeration on ice to cool the tissue and render it to a state which will facilitate the cutting of thin sections (6 micra) by use of a microtome. The sections were adhered to glass slides treated with a non-reactive adhesive material. Sections were then dried in a hot air oven. The tissues sectioned were lung, jejunum, pancreas, liver, gall bladder, adrenal, kidney, heart.

Standard histological staining procedures were used to demonstrate various chemical changes. The most widely used stain for routine diagnostic purposes is Haematoxylin & Eosin. The procedure follows:

1. Xylene—agent used to remove paraffin from slide and tissue.
2. Absolute alcohol—dehydrating agent which renders the tissue miscible with water.
3. Distilled $H_2O$—washes slides clean of alcohol and lowers the surface tension so sections will not become loosened from glass side.
4. Haematoxylin—nuclear stain which is acid in nature and stains the nucelar elements dark blue.
5. Acetic acid wash—to remove excess Haematoxylin from cytoplasm of cells.
6. Wash in running tap $H_2O$ to intensify the remaining nuclear stain with several drops of ammonia.
7. Eosin Y—alcoholic solution. Slides are agitated in this solution for 30 seconds. This solution stains the cytoplasm of the cell pink to red, depending on length of time allowed to stand in bath.
8. Absolute alcohol—wash to remove excess stain and dehydrate.
9. Absolute alcohol—to remove excess stain and dehydrate.
10. Xylene—2 changes to clear the tissue and render it as refractive as possible to light, passing through it when examined by means of a microscope.

The rabbit in each pair which was sensitized with the heavy metal ion was shown to have accumulated the metal ions in the vital tissues in readily detectable amounts. The rabbits which had been sensitized with the metal ions, then desensitized with secretin were found to have purged their systems of the abnormal amounts of the metal.

The determination of cooper in the tissues of rabbits 1 and 1A was determined by using copper free rubeanic acid in the method as described in Okamoto, K. and Utamura, M.: Biologische Untersuchugen des Kupfers, I. Histochemischo Kupfernach Weismethode, Acta School of Med. Univ. Imp. Kioto 20:573–580, 1938 as modified by Usman, L. L.: Histochemical Localization of Copper with Rubeanic Acid, Lab. Investigation 5:299–305, 1956. The sensitized rabbit gave a positive reaction for copper while the desensitized rabbit gave a substantially negative reaction.

The tissues of rabbits 2 and 2A were evaluated for copper, cobalt and nickel by the method as desdibed in Lillie, R.D. Histopathologic Technic and Practical Histochemistry, New York. The Blakiston Co., Inc. pp. 104, 243–245, 266–267, 441, 443–1954.

The copper, cobalt or nickel salts were indicated to be present in sufficient quantities by the following as granular precipitates.

Copper rubeanate—greenish black
Cobalt rubeanate—yellowish brown
Nickel rubeanate—blue-violet These reactions have sensitivity and concentration limits (in vitro) as follows:

|        | Sensitivity,[1] mcg. | Concentration |
|--------|----------------------|---------------|
| Copper | 0.006                | 1:2,500,000   |
| Cobalt | 0.03                 | 1:1,660,000   |
| Nickel | 0.02                 | 1:1,250,000   |

[1] In 0.015 ml.

The reaction of cobalt and nickel as well as copper occurs since the rubeanic acid acetate solution is alkaline rather than acid. Therefore, cobalt and nickel rubeanates are precipitated, whereas in an acid medium they would go into solutions and not be demonstrable. In vitro this method is very sensitive. However, with protein bound metals in animal tissues the sensitivity is decreased.

The tissues of the heavy metal sensitized rabbit gave a positive result while the desensitized rabbit gave a negative result.

The test for the presence of zinc ions in the tissues of rabbits 3 and 3A was determined using the dithizone method in a manner as adapted from Mager, M. McNary, Jr., W. F. and Lionetti F.: The Histochemical Detection of Zinc. J. Histochem, and Cytochem. 1:493–504—1953.

In rabbits 4 and 4A the presence of significant amounts of ion in the tissue was determined by using the conventional Prussian Blue Method.

In Rabbits 5 and 5A the presence of zinc was determined by the method adapted from Okamoto, K. Aoyama Z., Ibaraki H., Narumi: M. Shibata Y., Kawasaki, D., Shibata, A. and Komatsu, K.: Production of Experimental Diabetes Mellitus and Zinc Reaction of Islets of Langerhans Hyogo. J. Med. Sci. 1:77–788—1951, which was modified in accordance with the teachings of Mager, M. McNary, Jr., W. F. and Lionetti F.: The Histochemical Detection of Zinc. J. Histochem. and Cytochem. 1:493–504—1953.

In Rabbits 6 and 6A the tissues were evaluated for lead in accordance with the method disclosed by Feigl, F. and Suter, H.A.: Analytical Use of Sodium Rhodizonate Industrial and Engr. Chem. 14:840–842—1942.

Sodium rhodizonate is a very sensitive indicator for lead, both at a neutral pH and more especially at an acid pH (3). However, the color of lead should be sufficient to distinguish it from barium and strontium rhodizonates.

It is of interest to note that other metal salts other than barium and strontium and lead react with sodium rhodizonate in vitro to form colored precipitates.

Those which react at a neutral pH are:

| Bismuth       | Brown red.  |
|---------------|-------------|
| Cadmium       | Do.         |
| Copper        | Orange red. |
| Mercury       | Brown red.  |
| Silver        | Black.      |
| Thallium      | Dark brown. |
| Uranium oxide | Brown.      |
| Zinc          | Brown violet. |

Those metals which react with sodium rhodizonate at an acid pH (3) are:

| Cadmium  | Brown red.  |
|----------|-------------|
| Mercury  | Do.         |
| Silver   | Black.      |
| Thallium | Dark brown. |
| Tin      | Violet.     |

However, the sensitivity of the reaction of rhodizonate with these metals is less than with lead. It is not likely that they would create any problem in the histochemical identification of lead or calcium (by virtue of contamination) by this method and it is possible to use sodium rhodizonate as a screening agent to detect a broad range of metallic ion contaminants in animal tissues which might induce allergenic reactions.

In rabbits 7 and 7A the presence of the mercuric chloride in the tissues of the rabbits was determined using the sodium rhodizonate method.

The presence of gold ions in the tissues of the rabbits of 8 and 8A was determined by the gold chloride, stannous chloride reaction wherein gold is evidenced as a purple brown precipitate.

The determination of antimony in the tissues of rabbits 9 and 9A was determined by the W. H. Emid stain technique using alizarin red.

The presence of bismuth in rabbits 10 and 10A was determined by the use of the brucine sulfate method wherein which bismuth deposits appear as orange red precipitates.

Sodium rhodizonate was used as the identifying stain for cadmium in rabbits 11 and 11A with a reddish brown stain being the positive test for cadmium.

The Rubeanic Acid Method was used as the test for nickel in rabbits 12 and 12A with a blue violet stain being the positive test for nickel.

EXAMPLE 4

In accordance with the procedure described in Example 1, 24 white New Zealand rabbits of approximately 5–6 pounds each were initially evaluated to determine that they were non-sensitive to common allergens. Each rabbit was then injected with 0.01% based on his body weight of each of the metal chlorides utilized in Example 1 and then retested in 24 hours to determine that they had been sensitized by the injection of the heavy metal ion. When all the rabbits were found to give a positive reaction, they were divided into two groups. One rabbit sensitized with each given metal chloride being in each group.

The first group was injected with a 5% saline solution of sodium bicarbonate until an amount of 0.05% of sodium bicarbonate based on the body weight of the rabbit had been injected. A few of the rabbits exhibit symptoms of slight alkalosis, otherwise no visible symptoms were observed. The blood serum of the rabbits injected with the sodium bicarbonate were again evaluated 24 hours after the injections and were found to be negative with regard to the precipitation tests with the allergens. It is believed that the injection of the sodium bicarbonate corrected the metal ion balance in the body tissues thereby overcoming the allergenic sensitivity as noted above.

The second group of rabbits were orally administered sodium bicarbonate in about the same amount that was injected into the first group of rabbits. This amount of sodium bicarbonate had no noticeable effect on the allergy sensitivity and presumably the sodium bicarbonate was neutralized by the normal gastric secretions in the stomach.

The amount of the sodium bicarbonate which was orally administered was increased significantly so as to overcome the effects of the neutralization by the gastric secretions. Within a period of approximately 1 hour, 1.5 grams of sodium bicarbonate was administered to each rabbit. The rabbits showed a considerable degree of listlessness shortly after the administration of the sodium bicarbonate. After approximately 24 hours, the serum of the rabbits was again evaluated, and it was found that all but two of the rabbits had become non-allergic to the allergens to which they had previously been allergic. The procedure was again repeated with the remaining rabbits and in the second test they were also found to be non-allergic to the allergens to which they were previously allergic.

The oral administration of the alkalizing agent appears to be of interest but not particularly feasible for most situations. For an animal of approximately 150–180 pounds for example, would have to ingest 30–45 grams of sodium bicarbonate within approximately an hour or so in order to obtain the given effect and this is quite an excessive amount of sodium bicarbonate. The injection method, however, does appear to have significant advantages because of its simplicity and its greater effectiveness. It should be appreciated however, that the injection of secretin is considered to be the preferred method in that it tends to give a more balanced treatment with less opportunity for adverse, though minor, side effects occurring.

It should be fully appreciated that the above noted Examples are given by way of illustration and that the amounts given can be varied within resonable amounts without departing from the scope of this invention. In addition, it is possible to substitute equivalent materials for those utilized in the above noted invention. The invention resides in the removal of the excess amounts of the heavy metal ions from the system to prevent allergies. The particular method employed, while considered to be important, is not at the heart of the invention. All methods for removal of the excess amounts including even such techniques as filtration and the normal chemical reactions are clearly included within the scope of the present invention.

What is claimed is:

1. The method of treatment of a warm blooded animal which exhibits a positive allergenic reaction to an allergen when the tissues thereof contain a concentration of a heavy metal ion, which comprises the step of administering intravenously to said animal an amount of secretin sufficient to render said positive reaction negative.

2. The method of claim 1, wherein the amount of secretin administered is at least an amount within the range of from about 1 to 10 micrograms per kilogram of body weight.

References Cited

Chaberek, Organic Sequestering Agents, J. Wiley, N.Y., 1959, pp. 187–191, 202–209, 477–485, 487.

Duhamel, Progress in Nuclear Energy, Part I, Series XII Vol.

Z, Pergamon Press, N.Y., 1969, pp. 169–171, 182–3, 188–90.

Chem. Abs., Vol. 71, 1969, No. 79446x; Vol. 71, 1969, No. 57250b.

STANLEY J. FRIEDMAN, Primary Examiner

U.S. Cl. X.R.

23—230; 424—2, 7